United States Patent [19]

Mallory et al.

[11] Patent Number: 4,821,027
[45] Date of Patent: Apr. 11, 1989

[54] VOICE INTERACTIVE SECURITY SYSTEM

[75] Inventors: John Mallory; Thomas A. D. Burgmann, both of Mississauga; Gary Lennartz, Rexdale, all of Canada

[73] Assignee: Dicon Systems Limited, Ontario, Canada

[21] Appl. No.: 121,417

[22] Filed: Nov. 16, 1987

[30] Foreign Application Priority Data

Sep. 14, 1987 [CA] Canada .................. 546816

[51] Int. Cl.$^4$ .................. G08B 19/00; H04Q 7/00
[52] U.S. Cl. .................. 340/521; 340/506; 340/539; 340/531; 340/692; 381/51; 364/513.5; 379/51
[58] Field of Search .............. 340/521, 539, 506, 692, 340/518, 500, 531–538, 825.06, 825.22, 825.27, 825.34, 825.36; 364/550, 513.5; 379/37–44, 51; 381/51

[56] References Cited

U.S. PATENT DOCUMENTS

| | | | |
|---|---|---|---|
| 4,228,424 | 10/1980 | LeNay et al. | 340/518 |
| 4,339,746 | 7/1982 | Ulicki et al. | 340/506 |
| 4,351,999 | 9/1982 | Nagamoto et al. | 340/692 |
| 4,375,329 | 3/1983 | Park | 355/14 C |
| 4,387,269 | 6/1983 | Hashimoto . | |
| 4,465,904 | 8/1984 | Gottsegen et al. | 340/518 |
| 4,500,971 | 2/1985 | Futaki | 364/513.5 |
| 4,509,543 | 4/1985 | Livingston | 134/57 D |
| 4,560,978 | 12/1985 | Lemelson | 340/539 |
| 4,577,182 | 3/1986 | Millsap et al. | 340/531 |
| 4,581,606 | 4/1986 | Mallory | 340/539 |
| 4,603,325 | 7/1986 | Marino et al. | 340/531 |
| 4,737,770 | 4/1988 | Brunius et al. | 340/531 |

Primary Examiner—Donnie L. Crosland
Attorney, Agent, or Firm—Lee & Smith

[57] ABSTRACT

A security system for monitoring and detecting security breaches in a home comprises a central monitor and a plurality of remote sensors for one or more of fire, smoke, intrusion, appliance operation and the like. Each of the sensors has a transmitter for transmitting an electronic message when the sensor goes into an alarm condition. The central monitor has a receiver to receive the electronic messages. An electronic microprocessor system decodes the received electronic message and takes the necessary course of action in accordance with a programmable scheme retained in electronic memory of the microprocessor system. The central monitor has a speech synthesizer responding to inputs from the microprocessor system. A keyboard is provided on the central monitor for allowing a user to interact with the security system. The microprocessor system is programmable via the keyboard to permit the user to customize the programmable scheme to render it unique to the user. The microprocessor system actuates the speech synthesizer to synthesize predetermined messages in response to input from the keyboard and in accordance with the programmable scheme based on received electronic message from the transmitters. The microprocessor system is capable of checking data as it is entered by the keyboard against what is required by the programmable scheme. This checking system permits the security system to announce an error message should the entered data be incorrect.

6 Claims, 47 Drawing Sheets

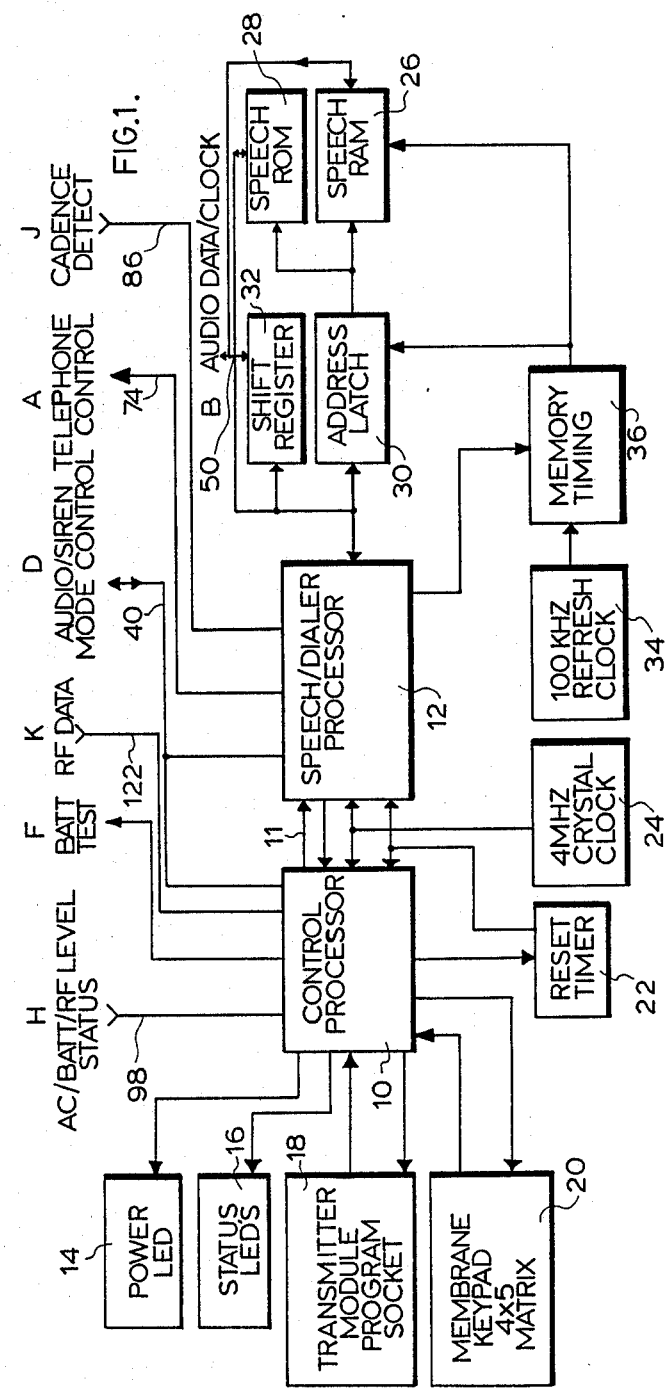

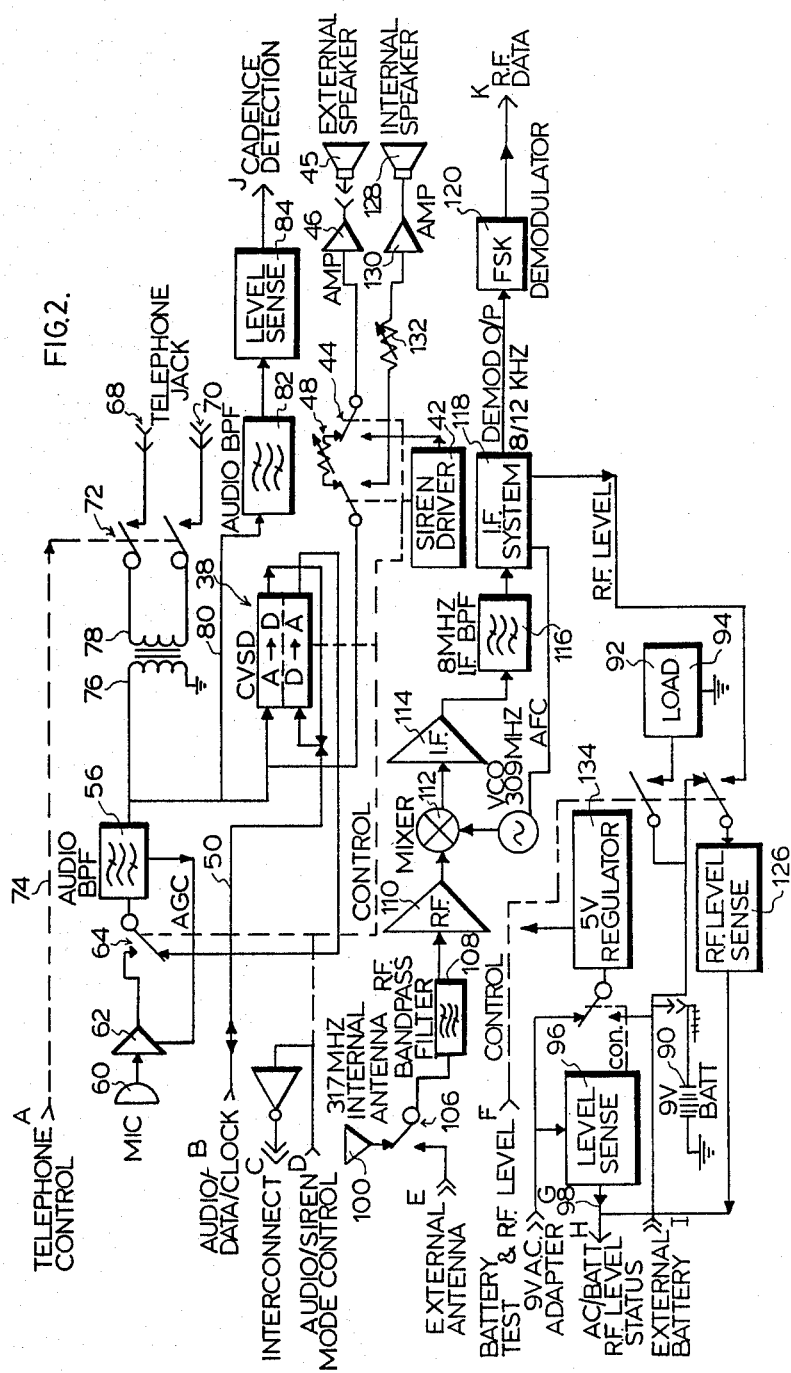

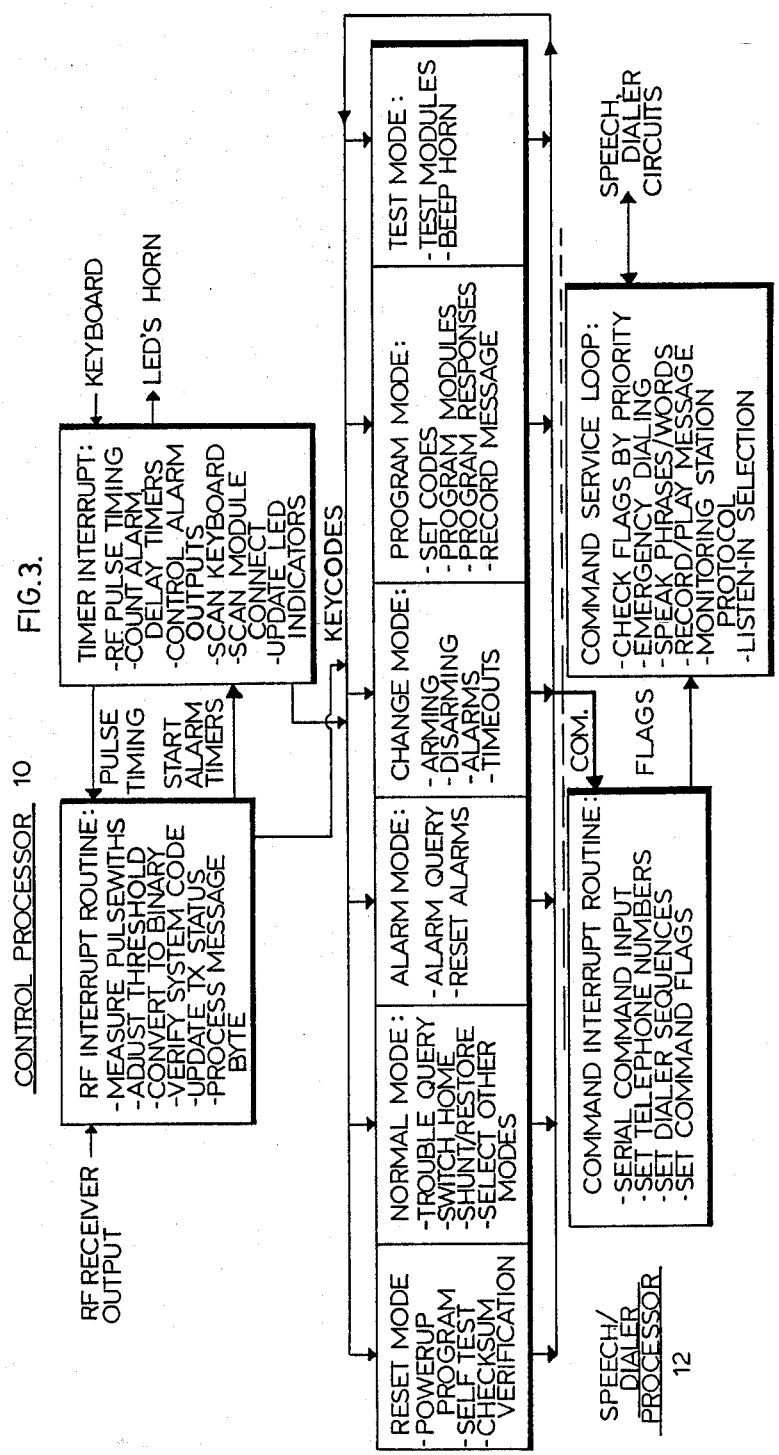

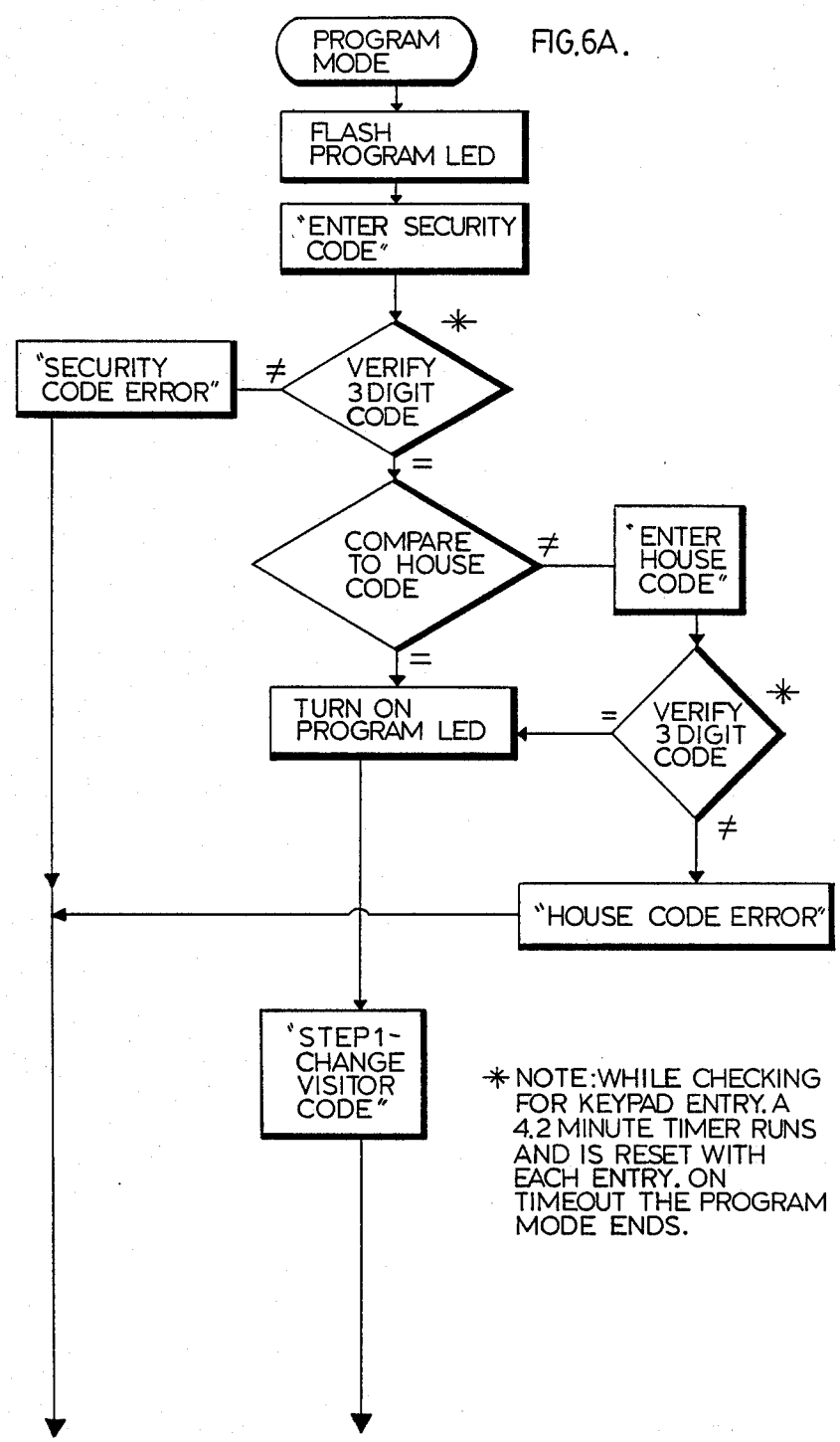

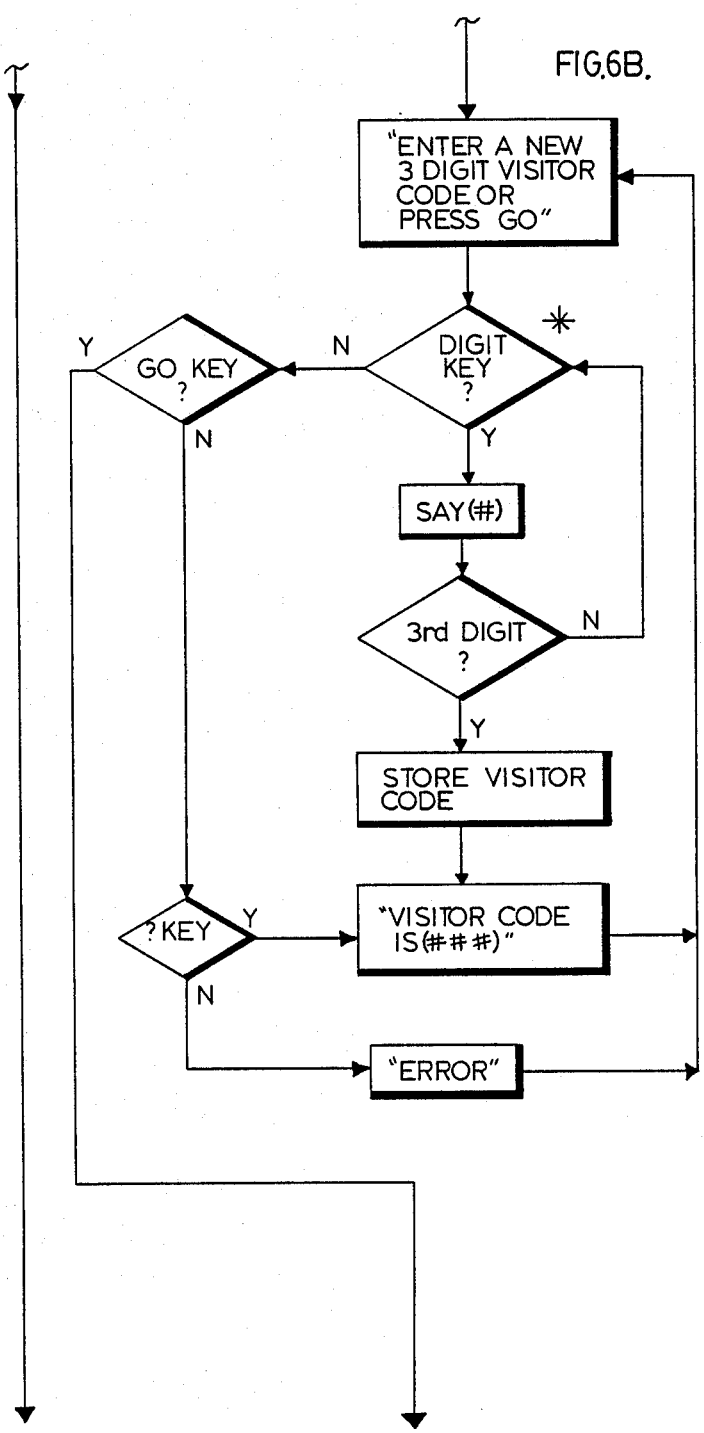

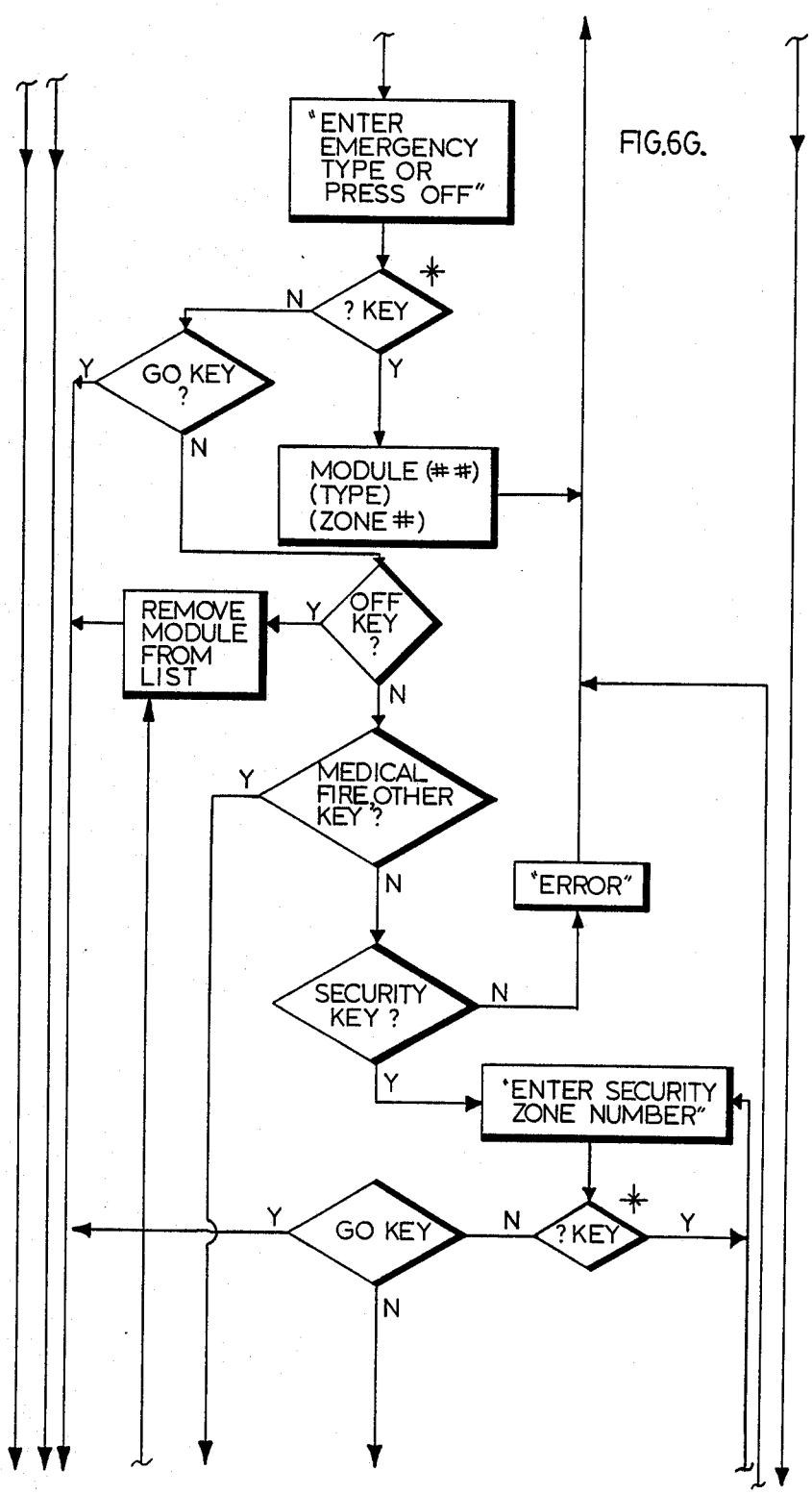

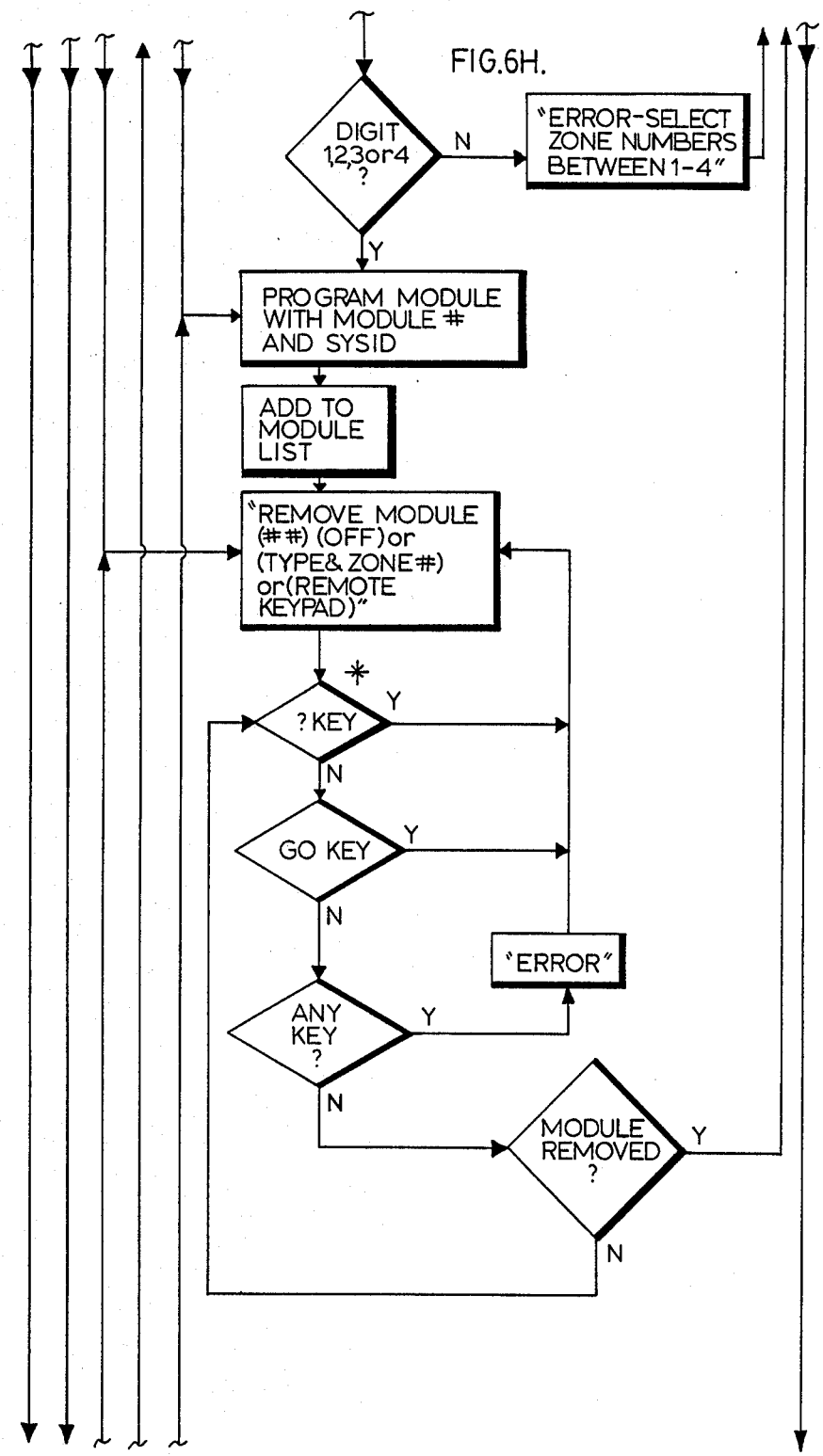

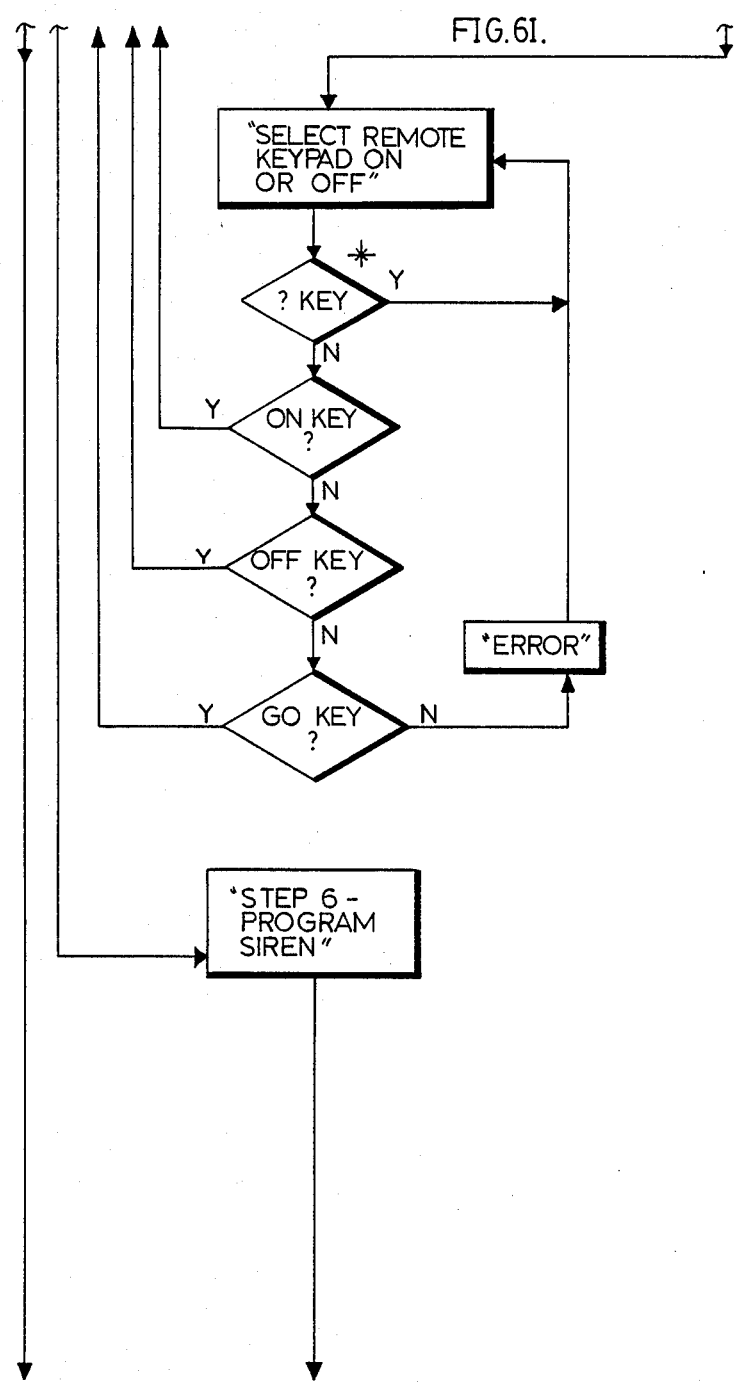

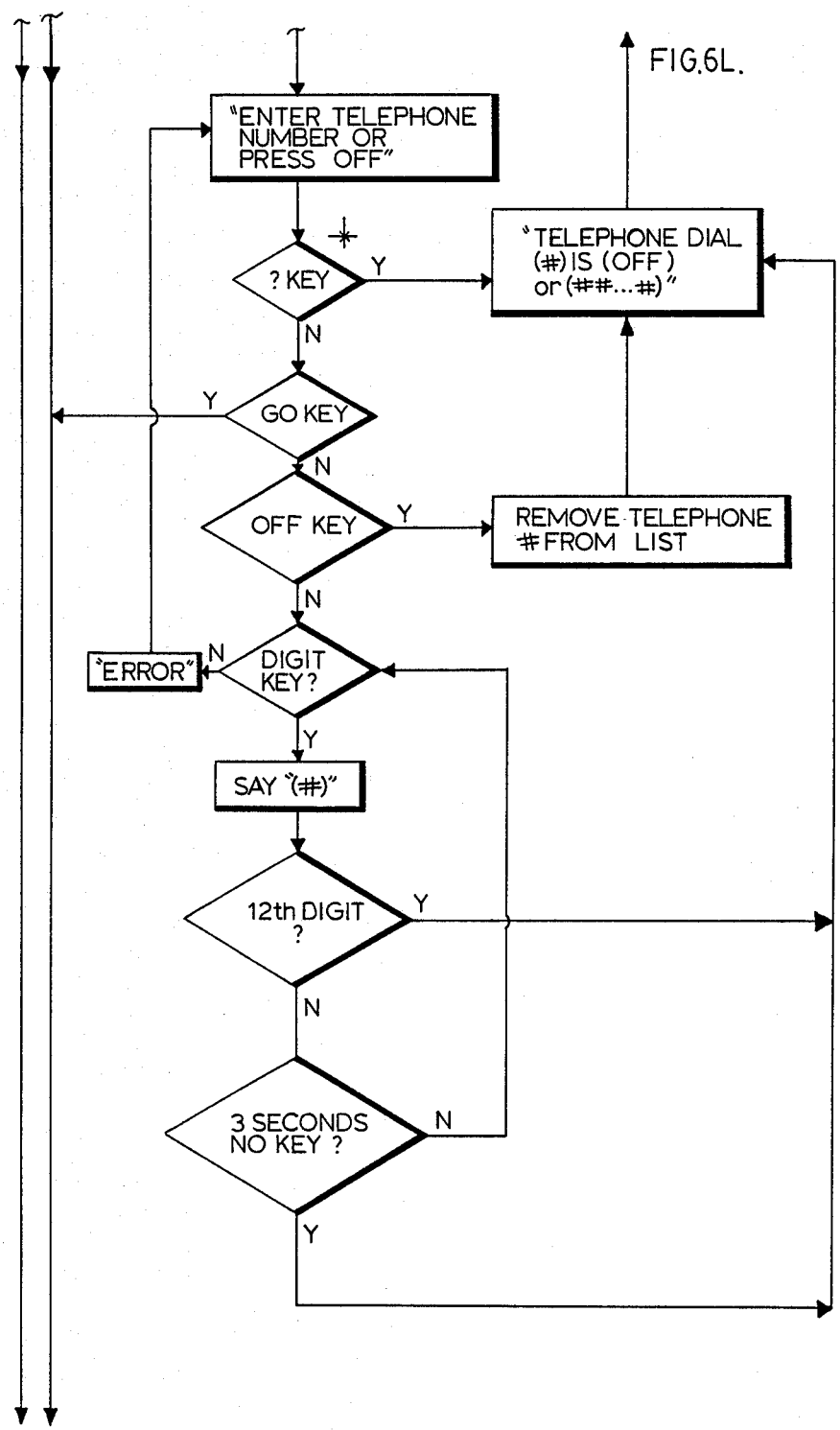

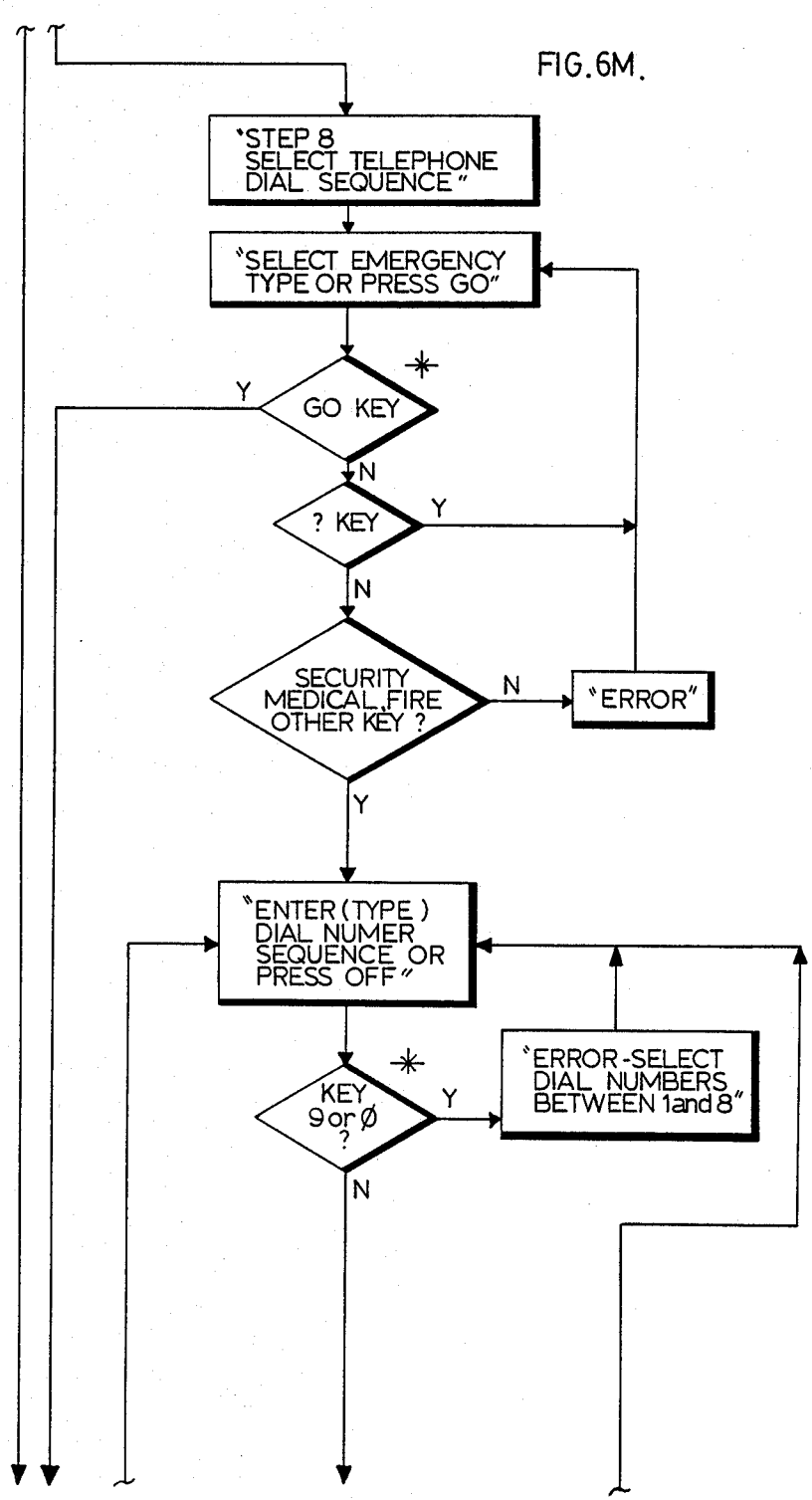

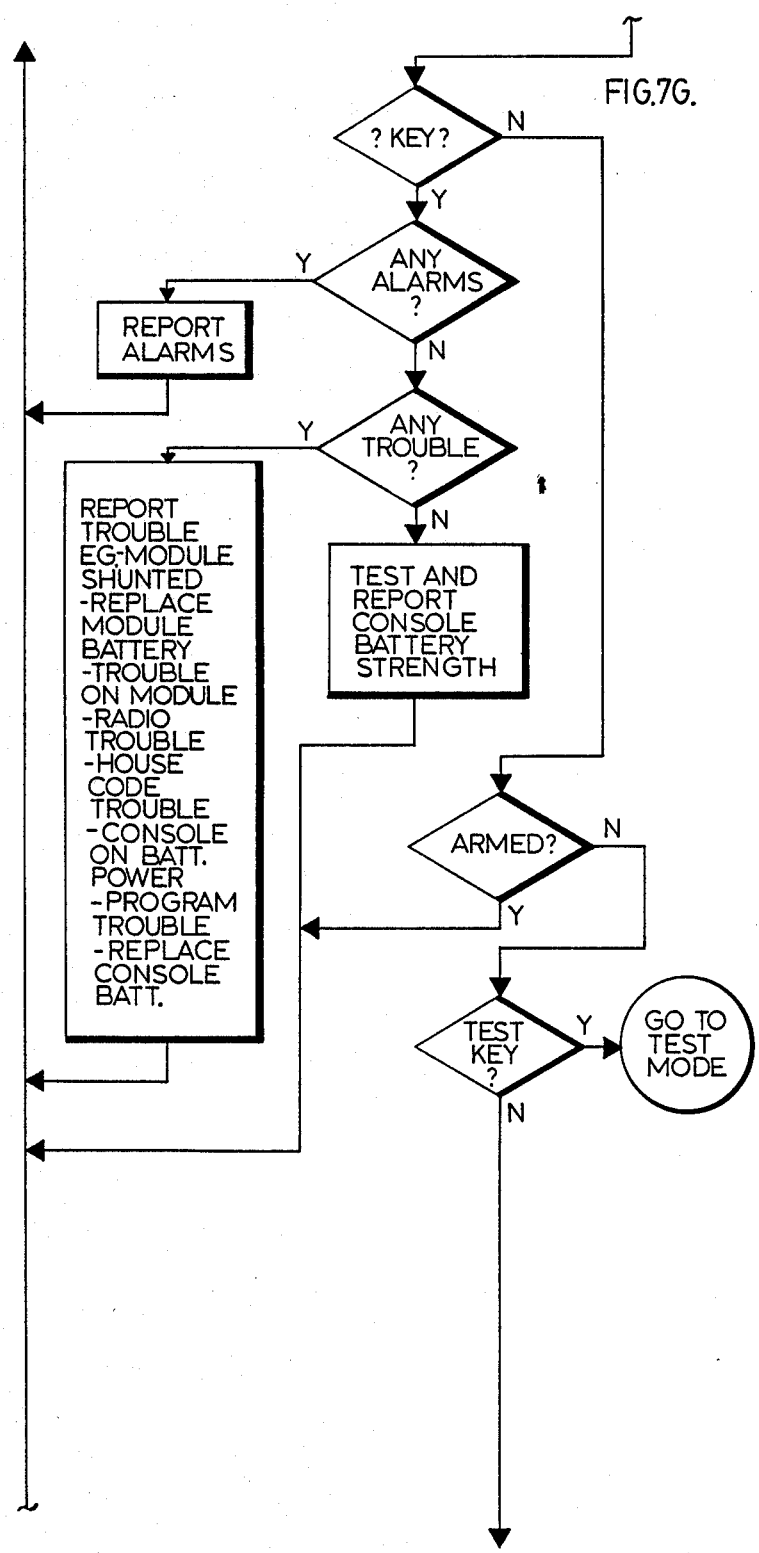

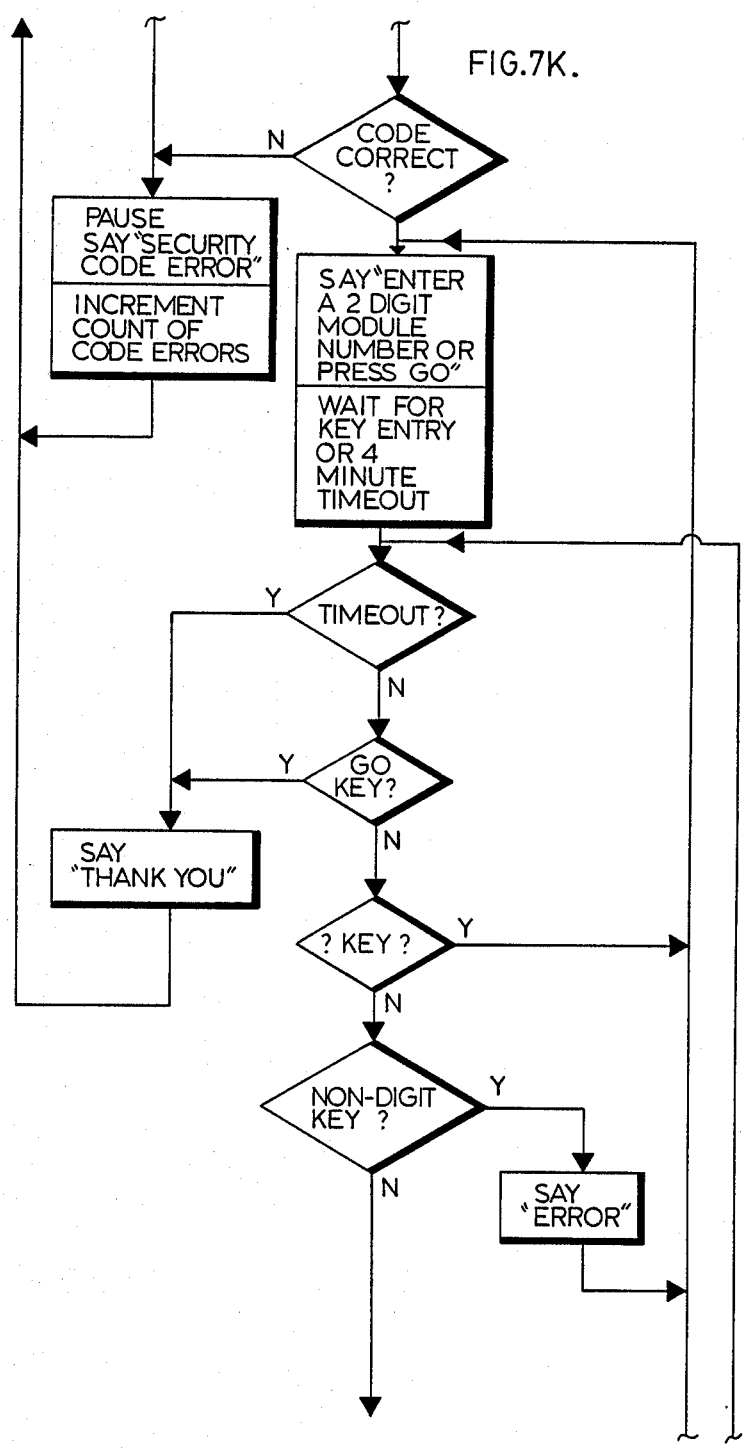

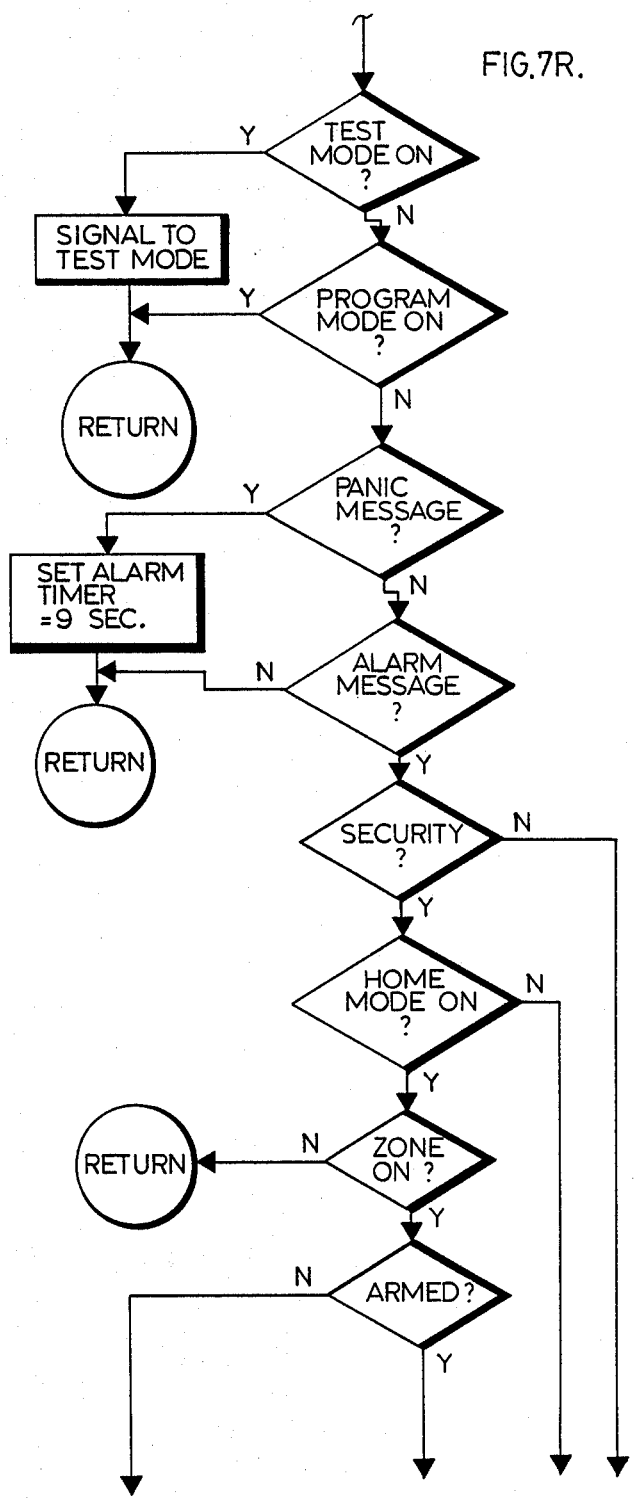

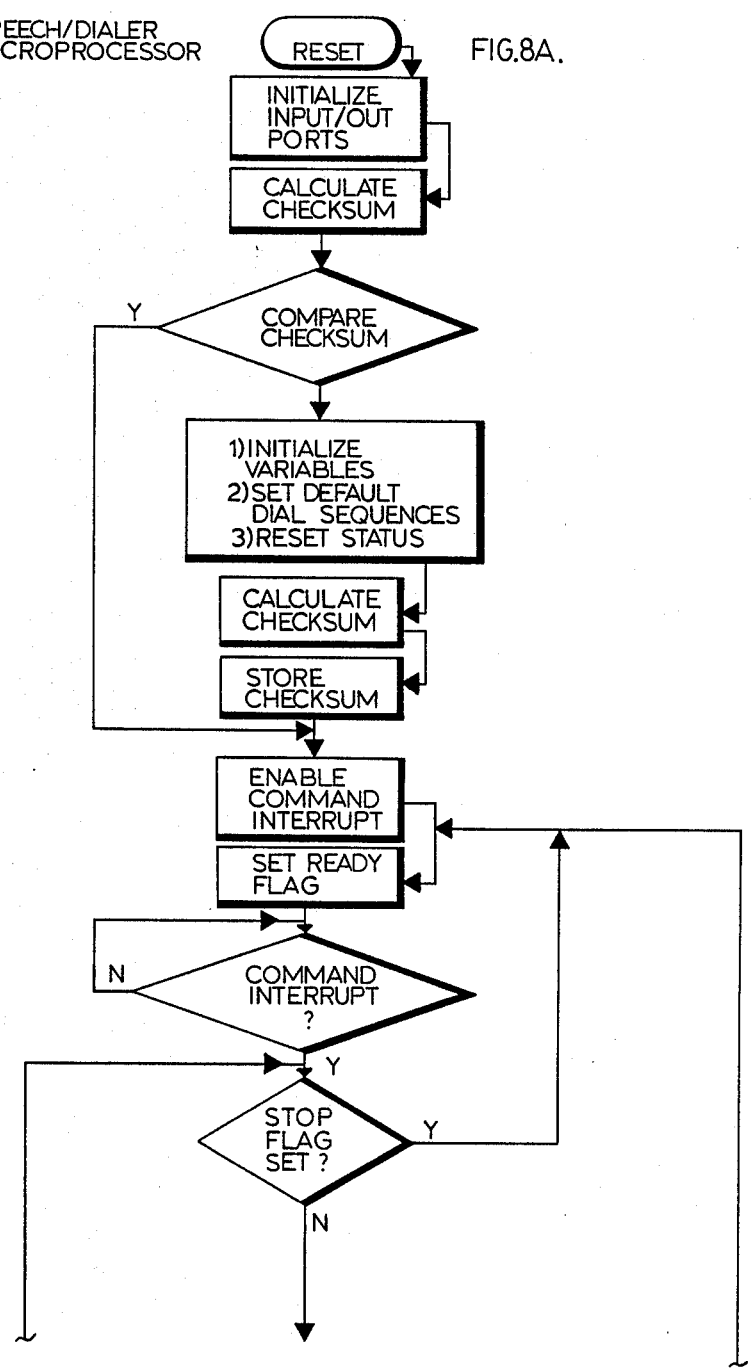

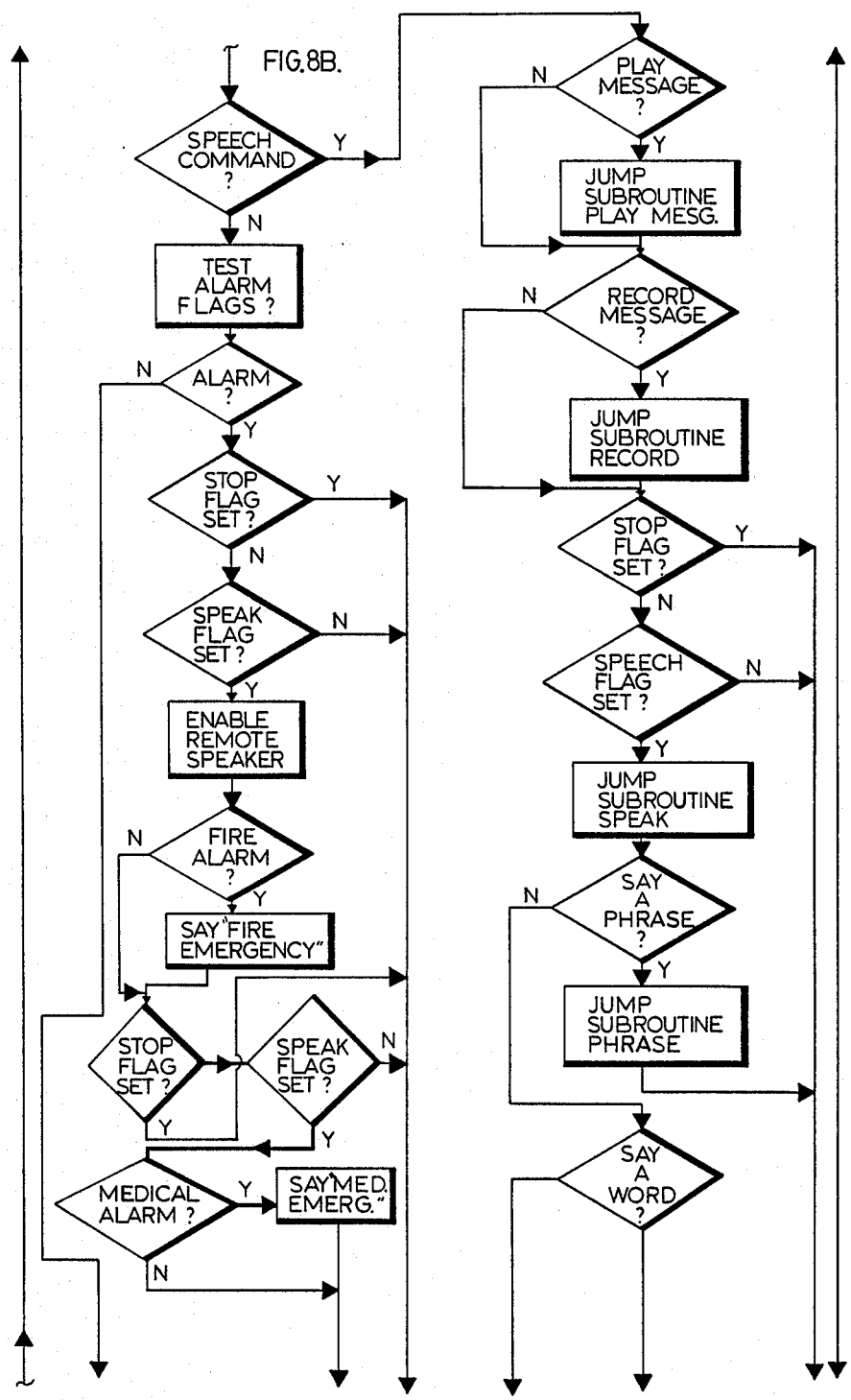

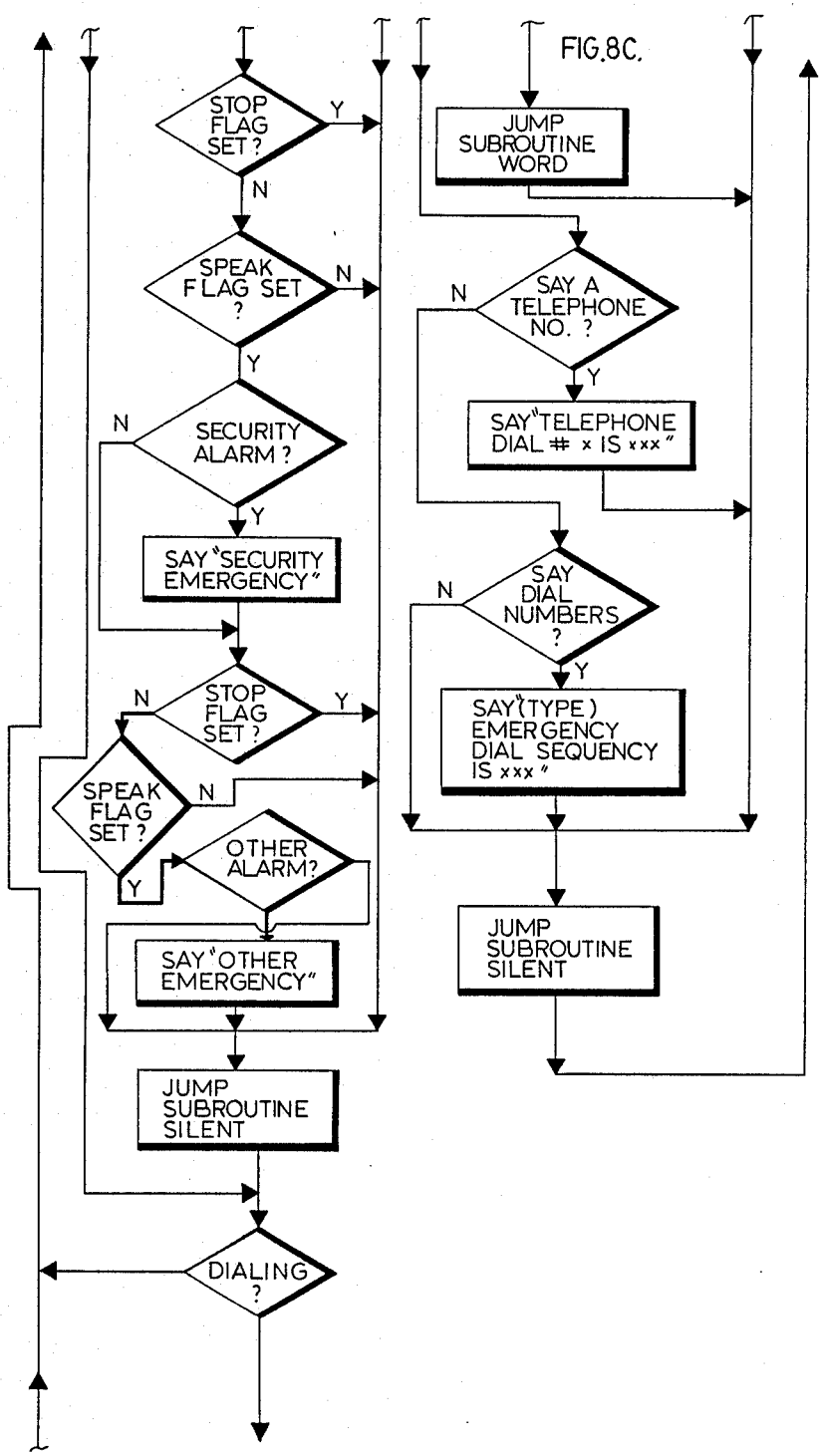

VOICE INTERACTIVE SECURITY SYSTEM

FIELD OF THE INVENTION

This invention relates to a security system having a central monitor and a plurality of remote sensors and more particularly where the central monitor includes processing facilities which ensure integrity of data loaded into the system in customizing the system to the particular user.

BACKGROUND OF THE INVENTION

Security systems are widely used in industrial, commercial, residential and other areas where security and safekeeping of material effects, computer software, company trade secrets and the like are required. Due to demands in this area, a variety of security systems have been developed, each particularly adapted to one or more of the above uses. For the industrial and commercial installations, significant sums of money may be spent on security systems which are operated by trained, experienced personnel. Many systems are available for this market. However, such systems are not readily usable in the household area because of their cost, complexity of installation and the lack of trained personnel in the normal household to run the security system.

Many attempts have been made to modify industrial style systems to provide for security in the home. However, these systems have failed commercially either because they are too expensive or the householder is not able to operate them. There remains, however, a significant demand for a security system which may be used in the home and which can monitor a variety of situations, yet can be readily operated by the householder.

Usually home security systems, which are to be installed by the home owner, include very extensive complex manuals which the householder must read and thoroughly understand before installing the system. Normally householders are reluctant to take the time to understand all aspects of the operation of the system before installation, resulting in frustration and eventually lack of interest in installing the system. Some attempts have been made to provide voice interactive systems which communicate with the user regarding the operation of the security system. This idea was contemplated in Lemelson, U.S. Pat. No. 4,560,978, regarding speech synthesis to verbally indicate or warn a person of a possible intrusion or fire in the monitored premises The speech synthesis is responsive either to signals generated by sensors or by computers or microprocessors receiving signals from one or more of the sensors, such as of fire or intrusion. In accordance with the characteristic of the signal received, the speech synthesizer produces an announcement indicative of the conditions sensed and, in some circumstances, the location of the condition is also announced. Announcing the type of alarm avoids the person monitoring the condition having to read and interpret a monitored display or light panel.

Speech synthesis is becoming a more common form of machine communication with operators. Speech synthesis has been used in fields outside of the security area. As discussed in U.S. Pat. No. 4,387,269, speech synthesis has many applications as an electronic calculator, time pieces, vending machines and automobiles. If communication is based on a one-way delivery, such as upon a detected condition, the speech synthesizer is actuated to make an announcement indicating the problem or condition. For example, speech synthesis is used in photocopiers as disclosed in U.S. Pat. No. 4,375,329. In response to detected conditions, a speech synthesizer is actuated to produce a phrase alerting the user that toner, paper or the like are to be added to the machine, or that a paper jam is to be cleared. Again, the system functions on the basis of detecting a condition and then making an announcement as to what has to be done to rectify the problem. Another form of "talking" photocopy machine is disclosed in U.S. Pat. No. 4,500,971. Again, the system includes a speech synthesizer which guides the user in start-up and use of the machine. Depending upon where in the start-up procedure the user is at, a particular announcement is made instructing the user as to the next step. In addition, this system includes other detection which may be announced such as requirement for paper or toner.

U.S. Pat. No. 4,509,543 discloses an industrial dishwasher which is provided with a speech synthesizer to communicate with the user. The system detects various faults, such as low water temperature, absence of drying agent, absence of detergent and the like. Speech synthesizers are actuated to advise the user of a fault. The user can then correct the fault and resume other tasks. The speech synthesizer is also equipped to explain step-by-step, how to start up and shut down the dishwasher.

All of these systems are preloaded with the necessary information to permit the speech synthesizer to communicate with the user. There is little, if any, interaction with the user for the purpose of correcting faults in the system as they are announced or instructions as to what may be done after the faults are corrected. There is some interaction with the user in the speech synthesis system of the electronic photocopying machine of U.S. Pat. No. 4,500,971; however, it is very limited. None of these systems contemplate a user customized program with data entry and programming error correction. This becomes a significant consideration in the security field which has not been addressed in the past.

According to this invention, a system is provided to address this problem in an economical, expeditious way. It provides a home security system which interacts with the householder during installation and use to greatly facilitate its operation and ensure integrity of the system operation.

SUMMARY OF THE INVENTION

According to an aspect of the invention, a security system comprises a central monitor and a plurality of remote sensors for one or more of fire, smoke, intrusion, appliance operation and the like. Each of the sensors has a transmitter for transmitting electronic messages when the sensor goes into an alarm condition. The central monitor has a receiver to receive the electronic message. An electronic microprocessor system decodes the received electronic message and takes the necessary course of action in accordance with a programmable scheme retained in an electronic memory of the microprocessor system. The central monitor has a speech synthesizer responding to inputs from the microprocessor system. A keyboard is provided on the central monitor for allowing the user to interact with the security system. The microprocessor system is programmable via the keyboard, thereby permitting a user to customize the programmable scheme by interaction with the security system through the keyboard to render thereby the scheme unique to the user. The microprocessor system actuates the speech synthesizer to synthesize predetermined messages in response to input from the keyboard and in accordance with the programmable scheme. The microprocessor system has means for checking data as it is entered by the keyboard against what is required by the programmable scheme. Means for initiating the microprocessor system is provided to actuate the speech synthesizer to synthesize a message relating to information input by the keyboard. The initiating means causes an error message to be synthesized when information entered via the keyboard is in error. The checking means verifies such information against what is required by the programmable scheme.

BRIEF DESCRIPTION OF THE DRAWINGS

Preferred embodiments of the invention are shown in the drawings, wherein:

FIG. 1 is a block diagram of the digital microprocessing units for operating the security system;

FIG. 2 is a block diagram for the interface of analog signals received or generated as such signals are interfaced with the digital system of FIG. 1;

FIG. 3 is a block diagram of the series of events in the operation of the control microprocessor and the intercommunicating speech/dialer microprocessor;

FIGS. 8a through 8d are flow diagrams for the logic in operation of the speech/dialer microprocessor.

DETAILED DESCRIPTION OF THE PREFERRED EMBODIMENTS

Figure 4A:
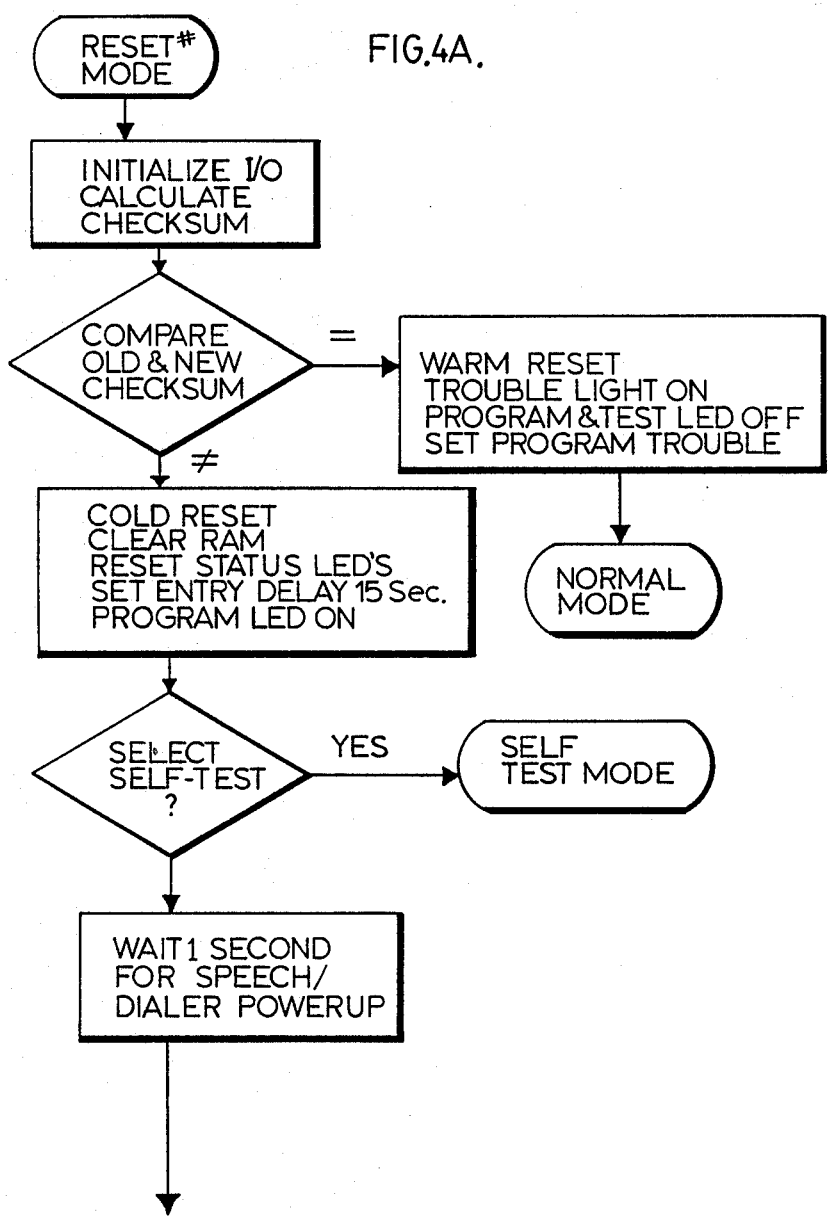
FIGS. 4a through 4e are flow diagrams of the logic in programming the system in an expedited manner.
Figure 4B:
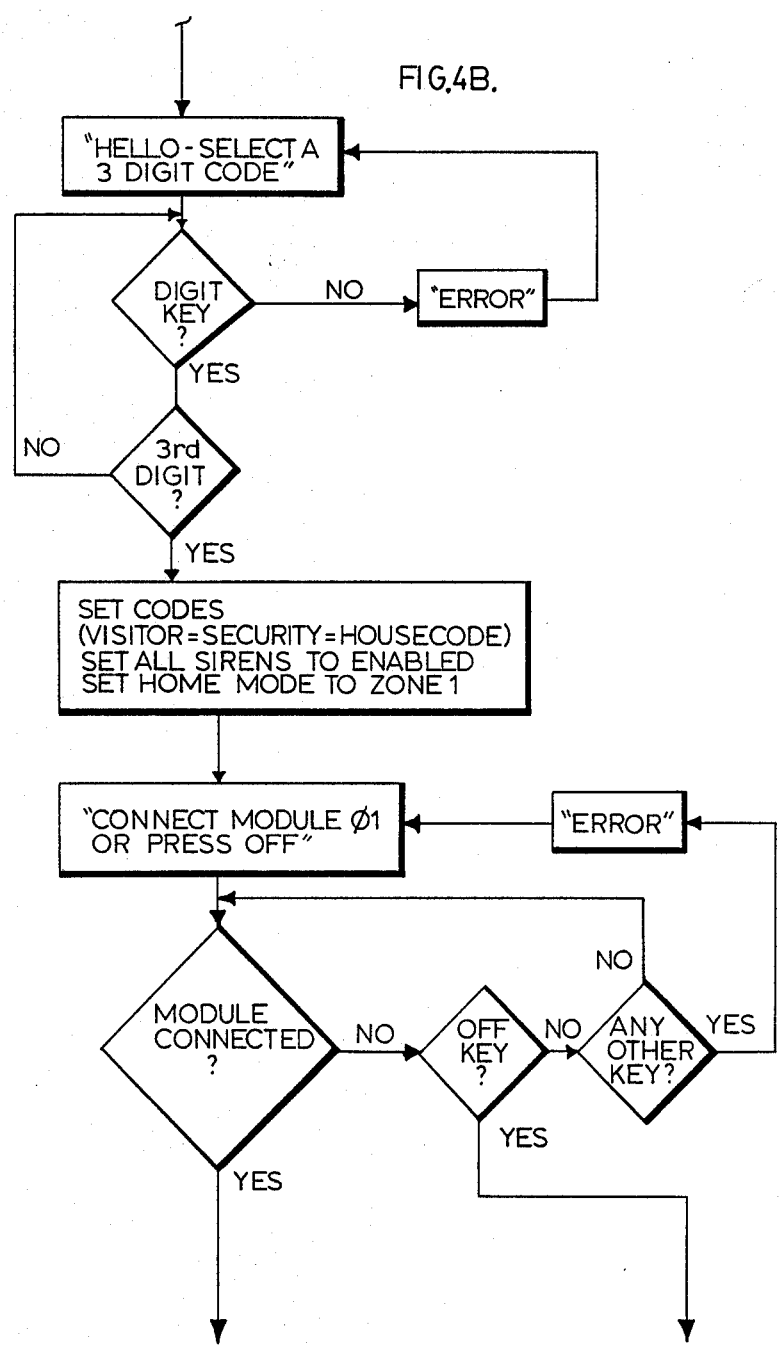
Figure 4C:
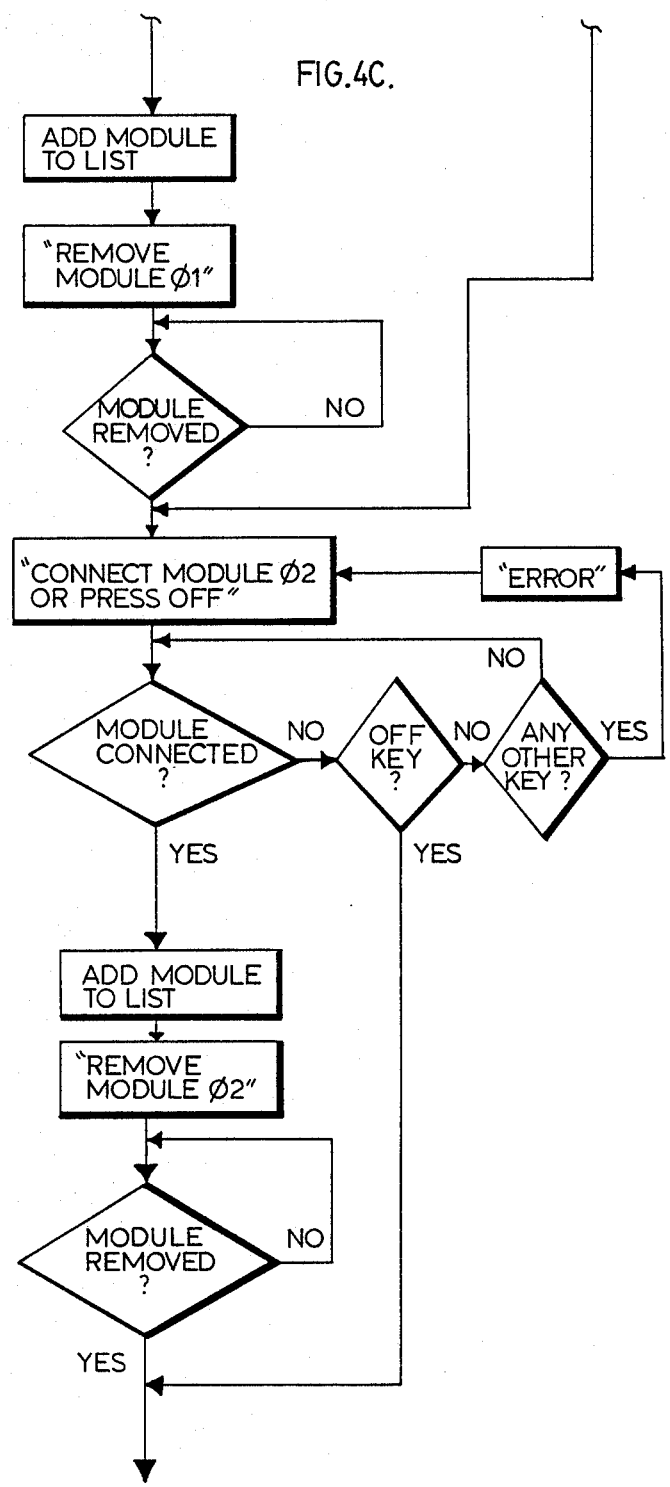
Figure 4D:
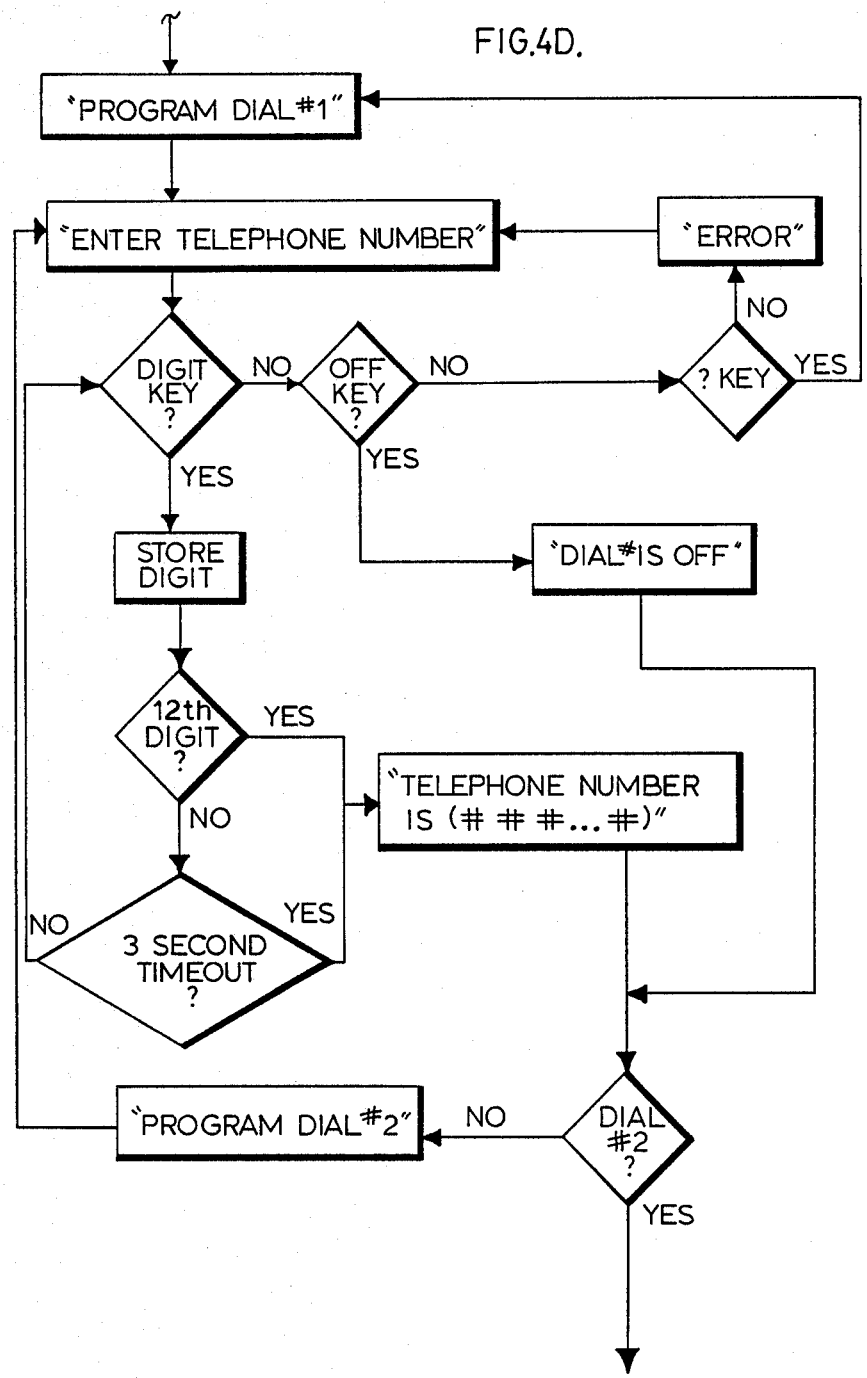
Figure 4E:
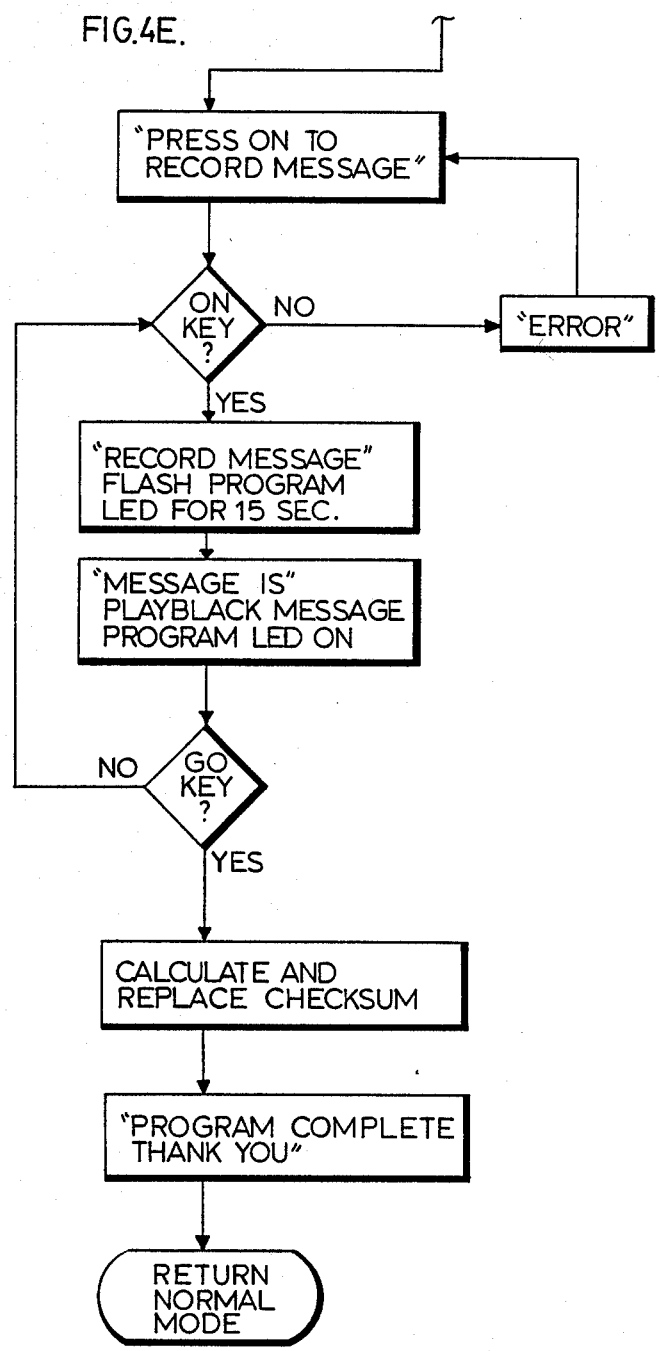
Figure 5:
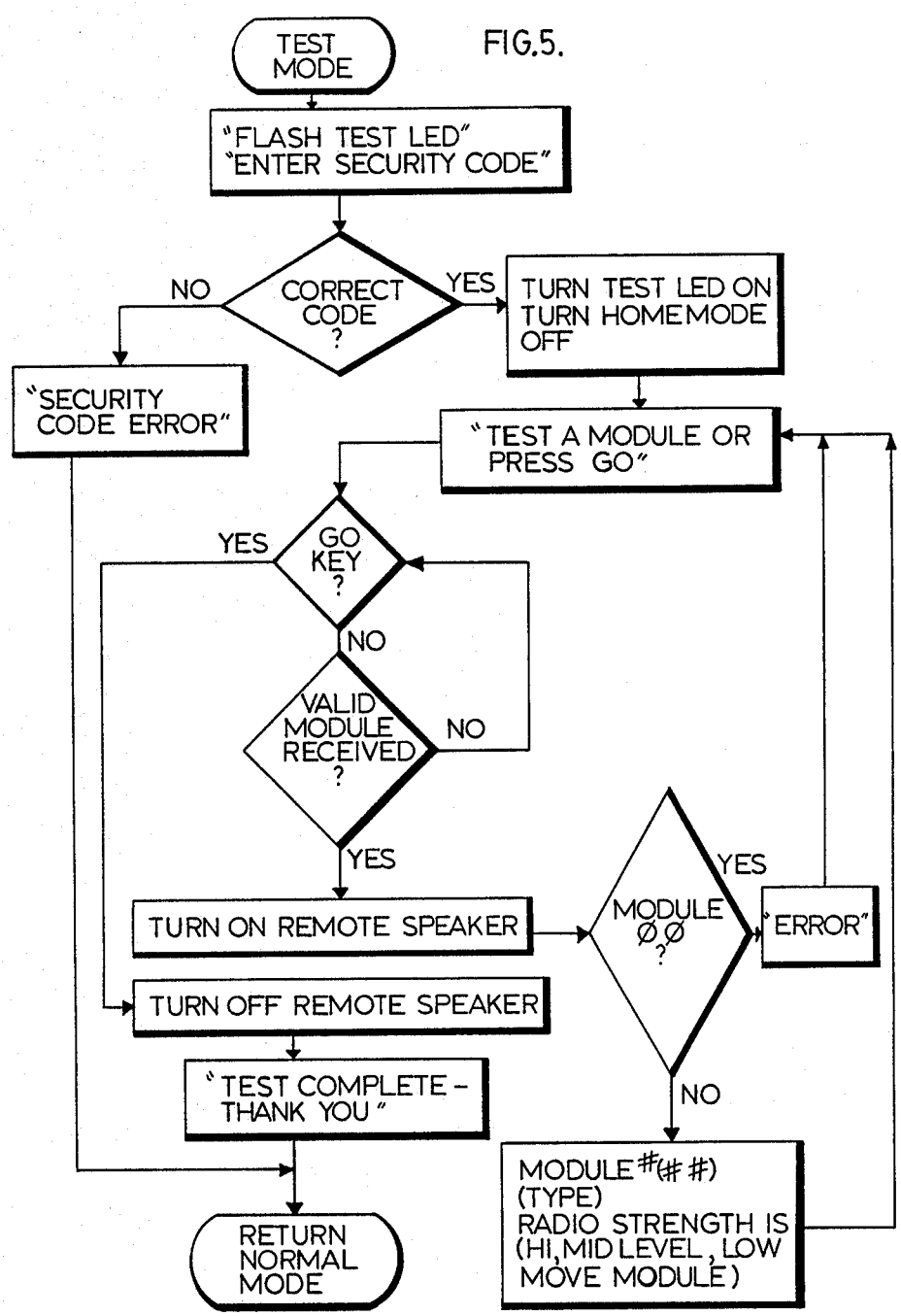
FIG. 5 is a flow diagram for the test sequence in evaluating placement location of remote sensors.

An exemplary type of central monitor for home security is shown in U.S. Pat. No. 4,581,606. In that system, a plurality of sensors for smoke, fire, intrusion, appliance operation and the like are provided. Transmitters are located on each of the sensors and the transmitter is programmed to transmit information indicating the type of alarm. The receiver of the central monitor identifies the transmitted information from a particular transmitter and therefore identifies the type of alarm and the location of the sensor. The central monitor then indicates the appropriate alarm by announcing verbally through a voice synthesizer. A variety of approaches may be taken in programming the central monitor and the interconnected modular units with the remote sensors. In addition, a variety of approaches are available with respect to the manner in which the hardware is developed, including microprocessor systems to control the security system, to synthesize the necessary speech statements, dial telephone numbers and make announcements within the monitored premises. In accordance with this invention, the hardware is controlled in a novel way which provides for additional information input by the user. The hardware with microprocessor control, in accordance with this invention, may supervise and control a multiplicity of individual sensors of up to and more than 30. The system includes a voice synthesizer which is controlled in such a manner as to interact with the user via a keyboard system. Controls are provided to ensure that, by way of such interaction with the user, the integrity and accuracy of the data entered by the user is always correct. To provide for enhanced speed of operation of the system, a first microprocessor is provided to act as the master or control microprocessor. A second or slave microprocessor intercommunicating with the first microprocessor is provided to control all functions of speech synthesis and telephone dialing. The system is equipped with both an internal speaker provided in the security console and an external speaker which may normally be in the form of a siren, horn or the like. Voice communication can be provided to the user either through the internal loudspeaker or through the external loudspeaker, particularly when it i necessary that announcements be heard throughout the monitored premises. A further advantage of this system is that the internal speaker of the security console remains silent during any intrusion alarm condition to ensure that the intruder does not readily locate the console. Instead, all announcements and desired siren alarm sounds are generated at the external speaker.

The master microprocessor and the slave microprocessor are preloaded with an instruction set. The purpose of the instruction set is to provide a form of interaction with the user as additional data is loaded into the system so that the security system is customized to the requirements of the particular user. The detail and manner in which the instruction set provides interaction with the user will be discussed with respect to the particular embodiments exemplified in the drawings.

The sequence of operation of the monitor system in the event of alarm can be summarized as follows. A remote sensor is triggered, for example, by an intruder opening a protected door. The transmitter module in the sensor transmits a radio signal alarm message. The central monitor console is provided with a receiver which receives and analyzes the alarm signal to determine if an alarm should be sounded immediately or whether a delay period is required For example, if the sensor is a security device protecting an access door, there may be a time delay before the alarm sounds. This is optional where the alarm could be immediate or a selectable time delay may be provided. A warning tone will sound during this period preferably over the loudspeaker system to alert the intruder, whether it is the householder or otherwise, that the security system is switching into an alarm mode. There is no time delay for an alarm in the event an intruder is entering through a window or other access area which is not normal to the coming and going in the premises. In that event, the central monitor console can be operated in a manner to actuate immediately an alarm. Also, immediate actuation of alarms can take place in event of fire, medical or instructed devices, such as panic alert. Either at the end of a delay period or immediately upon detecting an alarm situation, the siren begins to sound with announcements being made over the external siren. After sounding the siren and after another predetermined delay, the telephone dialer microprocessor begins to dial the telephone numbers entered into the system. The siren may sound for a predetermined period of time, such as up to five minutes.

After the siren has completed its cycle and even after the dialer has finished dialing all of the loaded telephone numbers, the console which is provided with a security light, will continue to flash to inform the home owner that an alarm has occurred. The console may be provided with a query key. Upon the home owner pressing that key, the console will identify the sensor where the alarm occurred. If an emergency key is flashing and that key is pressed, the console will identify the sensor where the emergency occurred to inform fully, the user of the emergency situation.

With reference to FIG. 1, the two controlling systems are the control microprocessor 10 and the slave microprocessor 12. A number of peripheral items communicate interchangeably or in one direction with these two microprocessors, including the analog/digital circuitry of FIG. 2. The intercommunication between these two circuits are exemplified by the alphabetical listing of contacts A through K. The control microprocessor 10 has its own internal read-only memory and random access memory which enables it to interpret all RF data coming into the system from remote transmitters including alarm messages polling messages and manual entry from the console keyboard. Based on input to the system through the keyboard, the control microprocessor is enabled to interpret all RF data received by transmission or by keyboard for arming or disarming the system. The power LED is provided to indicate to the user that the system is properly powered. In the event of power failure, the control microprocessor 1 may actuate a flashing LED to indicate power loss and that the unit has switched to battery backup. In addition, many other LEDs may be employed to indicate various conditions in the operation of the system. This is performed by status LED control 16 which is actuated by the control microprocessor 10. A variety of steady and flashing signals may be provided at the keyboard to indicate a security breach or emergency condition. The keyboard is monitored by the control microprocessor 10. The keypad may be of membrane type having a matrix to provide all the necessary keys to input numerical data or instructions.

Another important function of the control microprocessor 10 is in the programming of the transmitter modules which accompany each of the remote sensors. The microprocessor control includes a transmitter module program socket 18. The transmitter is provided with mating electrode prongs for insertion in the socket. The necessary information is then loaded into the transmitter through the control microprocessor via the transmitter socket 18. The control microprocessor 10 is adapted to sense when the module is inserted or removed from the socket. In accordance with a predetermined series of events, the necessary information can be loaded into the module to make it unique to the particular sensor with which it will be associated. The reset 22 performs the standard watchdog timer functions which prevent the system from stalling when it gets into a particular part of the program and for whatever reason cannot remove itself from that loop. Such system avoids tee unit from going dead, when, for example, the system in executing the software comes back to the same part of the program several times. This reset timer system will prevent the system from infinitely repeating that particular loop. The clock 24, as it communicates with the control microprocessor and the speech/dialer microprocessor, provides a common time base in operation for the two units in handling data within the system. When the reset timer resets the control microprocessor, it also resets the speech/dialer microprocessor 12 at the same time.

The speech/dialer microprocessor is adapted to take digital data from the speech random access memory 26 and the speech read-only memory 28 to generate the desired speech and telephone numbers to be dialled. The control microprocessor 10 sends requests to the slave mcroprocessor 12 to signal what the condition is and what must be done in actuating either or both of the speech and dialing systems. The control microprocessor therefore sends demands to the speech/dialer microprocessor by way of limited data commands typically one or two digits. The microprocessor for the speech and dialing operation then executes the command depending upon the alarm type. The keyboard may be provided with one or more keys which have their own predetermined set of software commands. For example, a test key may be provided on the keyboard such that when pushed, actuates the control microprocessor 10 to follow a sequence of queries of the user and instruct the user on steps to be taken in testing the module in identifying signal strength. In order to provide for variable messages depending upon the condition and the particular users requirements, the speech random access memory 26 is used in conjunction with the read-only memory 28. The necessary information to develop standard phrases is stored in the read-only memory 28, whereas information needed to customize the system to the user's requirements in supplying name and address or other information is provided in the speech random access memory. By way of the address latch 30, the speech/dialer processor selects the required data from the speech random access memory 26 and the speech read-only memory 28. In outputting data and receiving data through the speech/dialer microprocessor 12, the shift register 32 controls the flow of such information in accordance with standard techniques. The microprocessor 12 controls the dialer to dial numbers as stored in the speech/dialer microprocessor random access memory and to play over the telephone recorded messages to direct the human receiver of the phone message of the type of alarm. It is appreciated that the microprocessor in providing the dialer function may have separate random access memory as part of the microprocessor 12 and separate from the speech random access memory 26. The dialer portion of the microprocessor 12 will attempt to call all telephone numbers. The dialing procedure is continued until two dialed locations have acknowledged receipt of the message, then the dialing procedure is ceased. The telephone numbers are dialled in a predetermined sequence as requested by the user. The list of telephone numbers is dialled three times until two acknowledgements are received. Normally an acknowledgement is received when the dial "*" is pushed by the human receiver to provide the necessary tone burst which can be picked up by the speech/dialer microprocessor 12 through the cadence detection line J which will be discussed in more detail with respect to FIG. 2.

The speech random access memory 26 may be of the dynamic type which needs to be read on a regular basis to avoid memory disappearance. Hence a refresh clock 34 operates in conjunction with the memory timing 36 to accomplish this function and maintain the memory in the random access memory 26.

As shown in FIG. 2, the various inputs and outputs of the system are communicated by analog and digital signals. A continuously variable slope delta (CVSD) modulator/demodulator 38 is provided to effect all conversions of analog speech signals to digital data and conversely, of digital data to analog speech signals. By way of the audio control through interconnect D via line 40 from the control microprocessor 10 and the speech/dialer microprocessor 12, the CVSD modulator/demodulator is moved in a manner to either accomplish analog to digital conversion or conversely, digital to analog conversion depending upon the origin of the signal and the direction in which the signal must be expressed. In conjunction with the audio control through line 40, there is also control of the siren driver 42 through the integrated circuit analog switch 44. This switch functions in essentially the same way that a relay does. When the siren driver 42 is connected to the external speaker 45, which may be in the form of a horn, a whooping type siren alarm sound can be made to create a considerable level of noise in the area being monitored. With some types of horns and driver system, noise levels in the range of 96 decibels can easily be generated. A suitable amplifier with volume control 48 is provided in conjunction with the external speaker 45 such that the volume of synthesized speech can be varied, but the siren alarm is at full volume.

When the siren driver is not in use, it may be desired to announce over the external speaker various messages as synthesized by the speech synthesis microprocessor 12. The information to be announced is output through the shift register 32 via line 50 at connect B. Such information is fed to the digital to analog side 52 of the converter, where the appropriate control signal in line 40 is provided to move the system into that mode. The analog information emerging from the converter is transmitted via line 54 through switch 64 to the audio band pass filter 56. With the CVSD modulator/-demodulator in the proper mode, the information, as it is output from the filter 56, is transmitted via line 58 through the switch 44, volume control 48 and amp to the external speaker 45.

There are other situations when it is necessary to convert analog signals to digital signals for storage in speech random access memory. For example, a microphone 60 may be provided for recording various audio messages to be later announced. The ambient sound picked up by the microphone 60 is amplified by amplifier 62. By way of audio control through line 40, switch 64 is moved to the position to transmit the information through the audio band pass filter 56. With the audio control signal in line 40 positioning the CVSD modulator/demodulator in the analog to digital conversion position, the signal emerging from the audio band pass filter enters the converter through line 66 where the analog signal is converted to a digital signal. The digital signal is then transmitted along line 50 for input to the speech randon access memory. Information which may be input through the microphone 60 includes various announcements which the user requests be made either over the external or internal speakers of the system or over the telephone. For example, in the event of fire at the monitored premises, after dialing of a telephone number, a message may be played from the speech random access memory now through the digital to analog converter and out through a telephone line via the telephone jack interconnects 68 and 70. A switch 72 is controlled by the telephone control line 74 which is an output from the speech/dialer microprocessor 12. This selectively interconnects the system to the telephone jack when it is desired to, first of all, dial a predetermined number and then, secondly, make a recorded announcement. With the switch 72 in the closed position, the digital signal extracted from the speech random access memory 26 and as transferred by the audio data ine 50, is converted into an analog signal which is then transmitted along line 54 through the audio band pass filter 56 to the primary winding of coil 76. The secondary winding 78 transmits the analog signal through the telephone jack lines 68 and 70. Hence the person answering the telephone can receive a prerecorded message such as the name of the home owner, its location, and the type of emergency alarm. The user may also include in the pre-recorded message the necessary instructions to act on such emergency notice.

To determine when a person has received a call, the receiver is instructed to push the "*" button which produces a tone frequency. This tone is detected through the level sense system as the signal is transmitted through line 80 through band pass filter 82 to level sensing device 84 which is then fed via the cadence detection line 86 into the dialer microprocessor 12 through line J. Upon sensing the acknowledgement burst, the dialer microprocessor records that acknowledgement in memory and upon detecting two acknowledgements ceases any further dialing.

Other forms of level sensing are provided, as shown in FIG. 2. It is necessary to detect the level of the battery back-up which includes an external battery 88 and a nine volt battery 90. The levels of these batteries may be tested by applying a battery test load through switch 136 and device 92 which is connected to ground 94. With the load applied, the level sensing device 96 detects the battery level and provides a digital signal to the control microprocessor 10 via line 98. If the battery level is below a predetermined voltage, a trouble LED is flashed on the console keyboard.

In conjunction with the power source, either through the nine volt alternating current adaptor or the external battery supply, a five volt regulator 134 provides a constant voltage for operating the various components of the hardware discussed with respect to FIGS. 1 and 2.

As mentioned with respect to FIG. 1, a transmitter module is programmed to transmit a predetermined signal upon the sensing of an alarm at the remote sensor location. A 317 megahertz internal antenna 100 is provided. Also an external antenna 102 may be provided as coupled at 104. A switch 106 is automatically moved to select either the internal or external antenna. The signal picked up through the antenna 100 is passed through the radio frequency band pass filter 108. The signal is then passed through a radio frequency amplifier 110 to a mixer 112 which feeds the signal into the intermediate frequency amplifier 114. From the amplifier 114, the signal is passed through an eight megahertz intermediate frequency band pass filter 116 to an intermediate frequency amplifier 118 which provides either eight or twelve kilohertz signals which, in turn, are fed to an FSK demodulator 120 for converting the eight or twelve kilohertz signals to a digital signal for input to the control microprocessor 10 through line 122. The microprocessor 10 then analyzes the incoming signal to take whatever necessary action is determined by its onboard program in announcing an alarm, dialing phone numbers and taking whatever other predetermined action is needed. The radio frequency level of the signal picked up by either antenna 100 or 102 is fed from the intermediate frequency amplifier 118 through line 124 and switch 138 to a level sensing device 126 which detects the level of the signal and converts it into a digital signal to indicate the strength of the received signal as either being high, medium or low. Such signal in digital format is fed to the microprocessor 10 through line 98. The control microprocessor 10 acts upon information received concerning the level of the radio signal to announce a suitable message; for example, if in the test mode, the control microprocessor 10 directs the speech synthesizer 12 to announce that the level of transmission from the transmitter of the remote sensor is either high, medium or low. In the event of detecting a weak signal, a message is announced to move the transmitter to another location to improve transmission of signal. For example, the positioning of the transmitter adjacent to metal objects can significantly affect the transmitted signal. Large metal objects include refrigerators, stoves, sinks, filing cabinets, metal closets, metallic wallpaper and the like. Other effects on the transmission include concentrations of electrical wiring or plumbing. By announcing over the external speaker that the transmitter has to be moved, the user can simply relocate the transmitter and test its location again without having to walk back to the central monitor to determine the quality of the signal transmission. This greatly facilitates installation of the system by way of the voice communication provided by the interrelationship of the control microprocessor 10 and the speech synthesizer 12.

As previously noted, an internal speaker 128 may be provided as driven by amplifier 130 with volume control 132. Switch 44 may be selectively moved to the contacts to feed the appropriate audio signal to the internal speaker, when desired, under the influence of control in line 40 as directed by the speech/dialer microprocessor 12. The internal speaker is used in making announcements in directing the user on how to operate the system and how to program the system to customize the system to a particular user.

As is appreciated, the components for this system in terms of the control and slave microprocessors are readily available. The standard type of 8-bit microprocessor is suitable for this application. The speech synthesizer aspect of the slave microprocessor may be one of a variety of types providing it interacts with the read-only and random access memories as shown in FIG. 1. An example of a speech synthesizer is that disclosed in the aforementioned U.S. Pat. No. 4,375,329. The continuous variable slope delta modulator/demodulator may function in accordance with the same type of modulator disclosed in this U.S Pat. No. 4,375,329.

The interaction of the control microprocessor 10 and the speech/dialer microprocessor 12 is laid out in block form in FIG. 3. Radio frequency data is input to the control microprocessor which interprets such information and takes the necessary steps in the predetermined modes itemized as: Normal Mode, Alarm Mode, Change Mode, Program Mode, or Test Mode. Interaction with the keyboard illuminated status signals via the LEDs and control of the siren and horn is also itemized. Commands then generated by the controller microprocessor 10 are fed through the interface 11 to the microprocessor 12 to execute the necessary speech commands and dial the necessary emergency numbers in the sequence determined by the user. Details of the logic regarding the action to be taken based on various inputs from the received signals and the keyboards, the instruction set and the information loaded by the user are illustrated with respect to the flow diagrams of FIGS. 4, 5, 6 and 7.

The purpose of the program logic of FIGS. 4a through 4e is to provide the user with an intelligent, quick start-up of the system. As is evident from the series of flow diagrams, the user is quickly guided through the steps of establishing a security code, programming two transmitter modules, entering two telephone numbers, and recording a message for playback over the telephone. An instruction set is preloaded into the control microprocessor 10, the speech/dialer microprocessor 12 and the related speech random access memory and speech read-only memory. Hence the system is pre-programmed to interact with the user in loading in even the simplest information, resulting in quick and easy operation of the system. The instruction set will check for errors in data entry when the system is being customized by the particular user. As shown by the flow diagram, during the entry of the three digit security code, a check is made to determine if the code format is correct. If it is not, the instruction to enter a three digit code is replayed by the speech synthesizer until the user gets the three digit code entered properly. Similarly in programming modules 01 and 02, checks are made to ensure that the module is in place and if not, the system reinstructs the user to do so. In entering a telephone number, a series of checks are made to ensure that a proper series of digits are entered and if not, an error statement is announced to alert the user that an improper entry has been made. Hence even with the quick start-up system, a sufficient number of checks are made during the data entry to ensure its accuracy and integrity. By this series of checks accurate operation of the system is assured even though the user may not be fully familiar with all functions of the system.

After the user has started up the system and programmed the transmitter modules, it is then necessary to test their location. With respect to FIGS. 5a and 5b, a flow diagram demonstrates the logic of the system in checking for proper installation. In the event that the signal strength is too weak, a command is synthesized by the speech synthesizer and announced at least over the external speaker 45 requesting the user to move the module. As already noted, by this approach in announcing signal strength over the high volume siren horn, the user can be anywhere in the monitored premises and learn the signal strength without having to go back to the central monitor. This greatly simplifies installation by the user and hence makes it more suitable for householder installation.

Figure 6C:
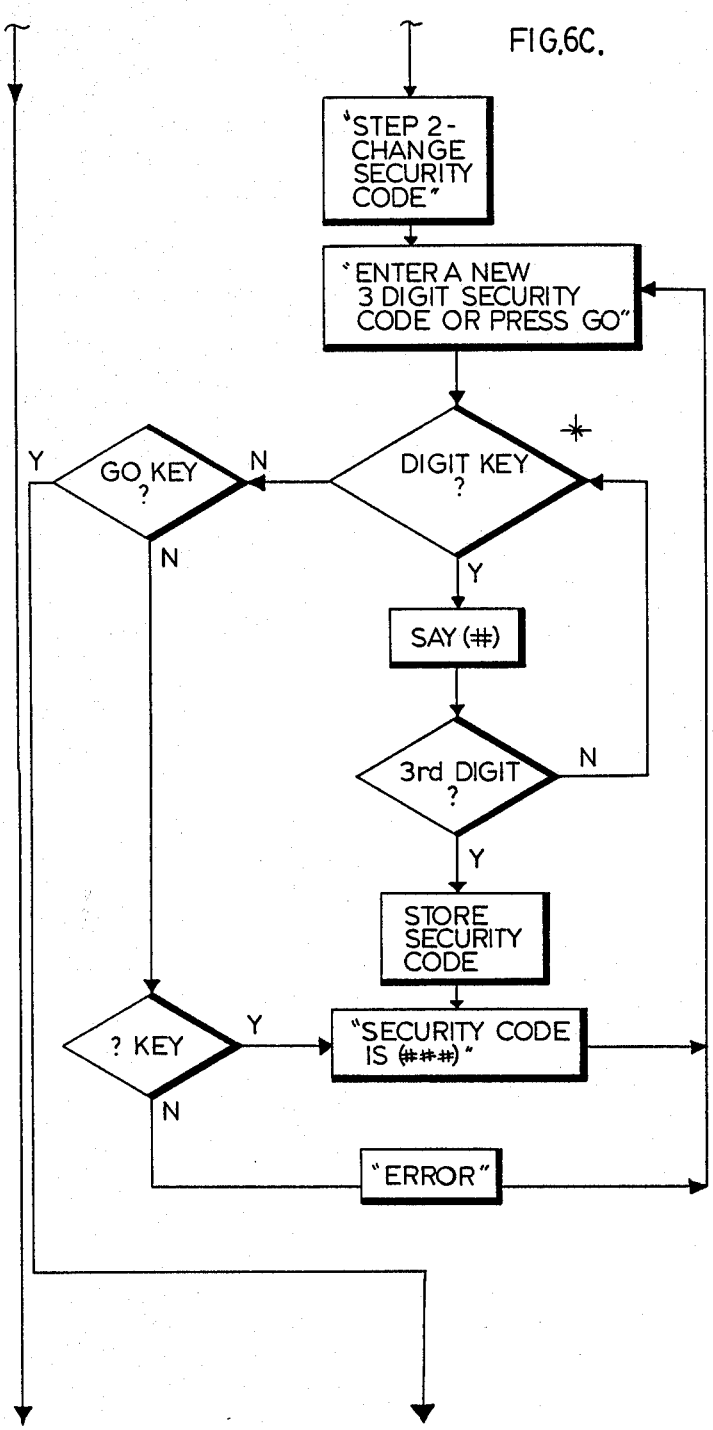
FIGS. 6a through 6o are flow diagrams of the detailed approach for programming the security system.
Figure 6D:
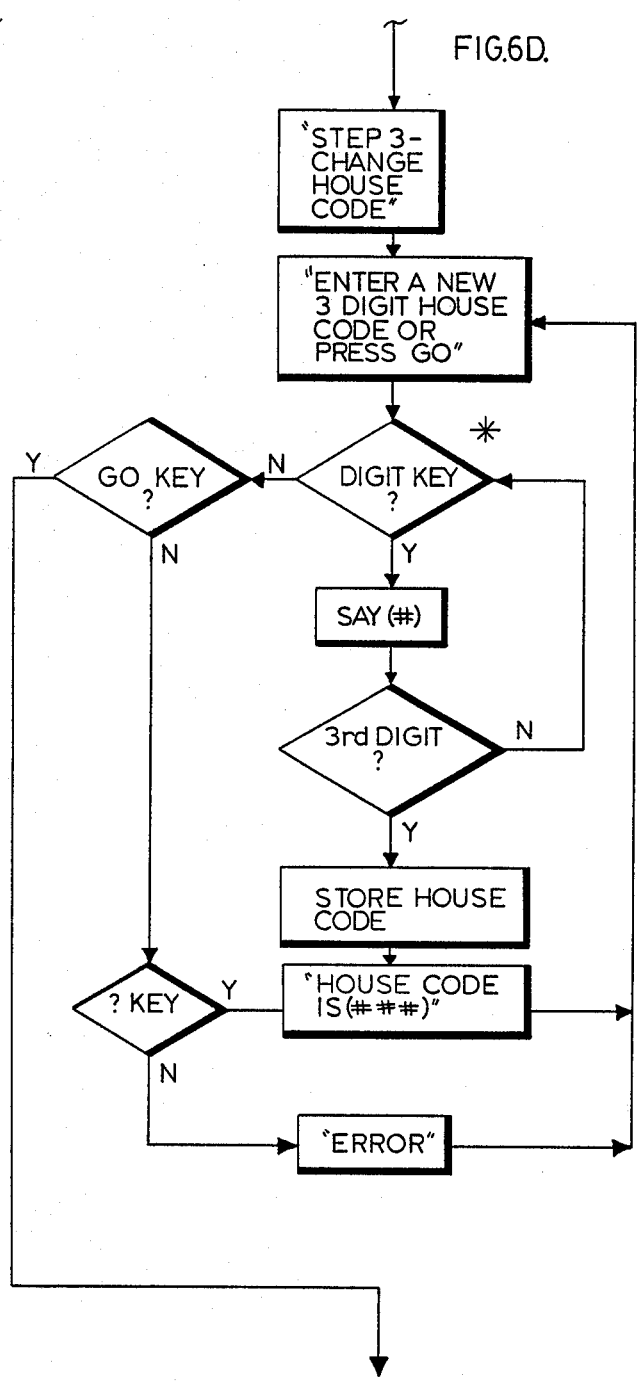
Figure 6E:
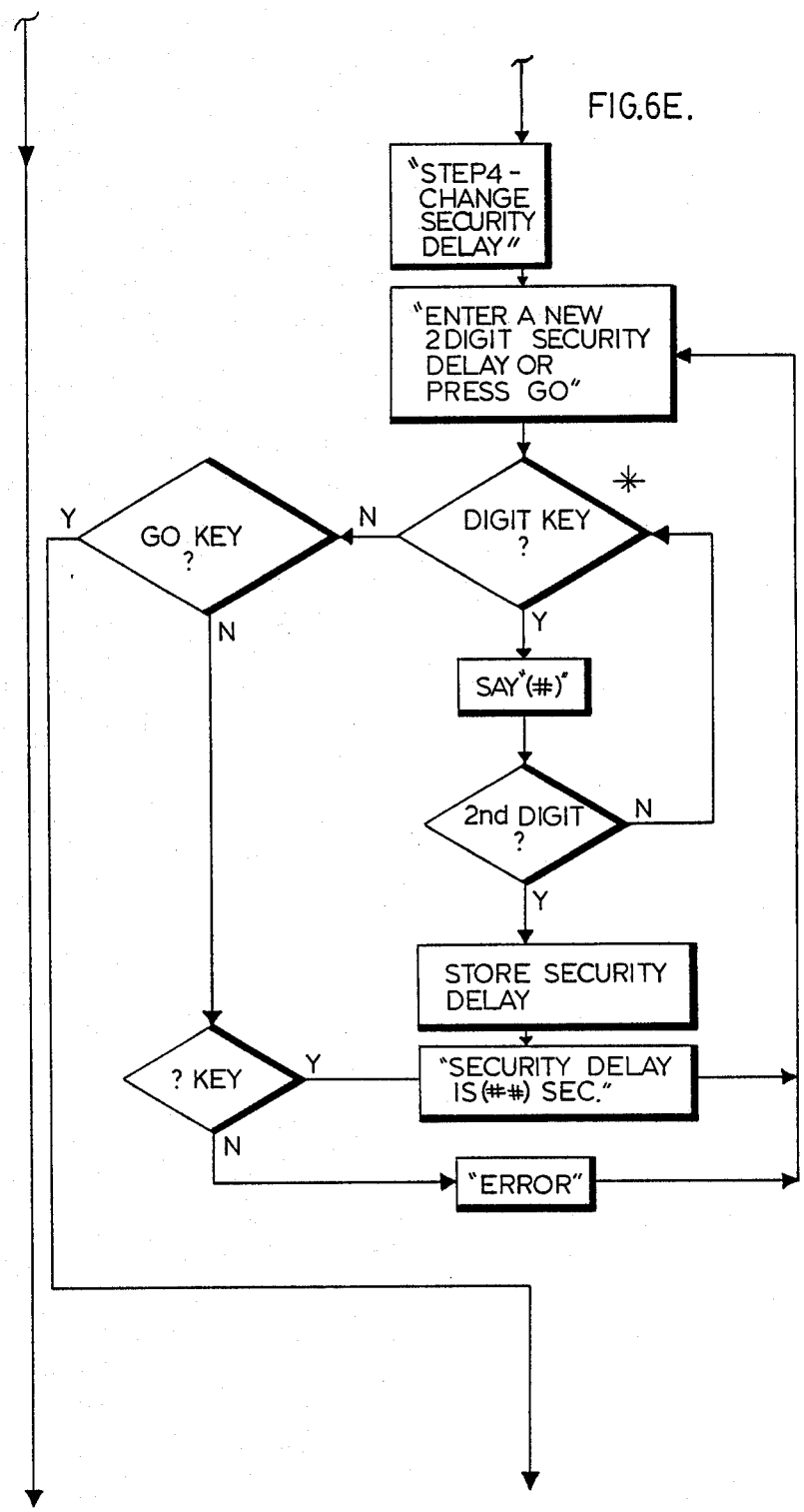
Figure 6F:
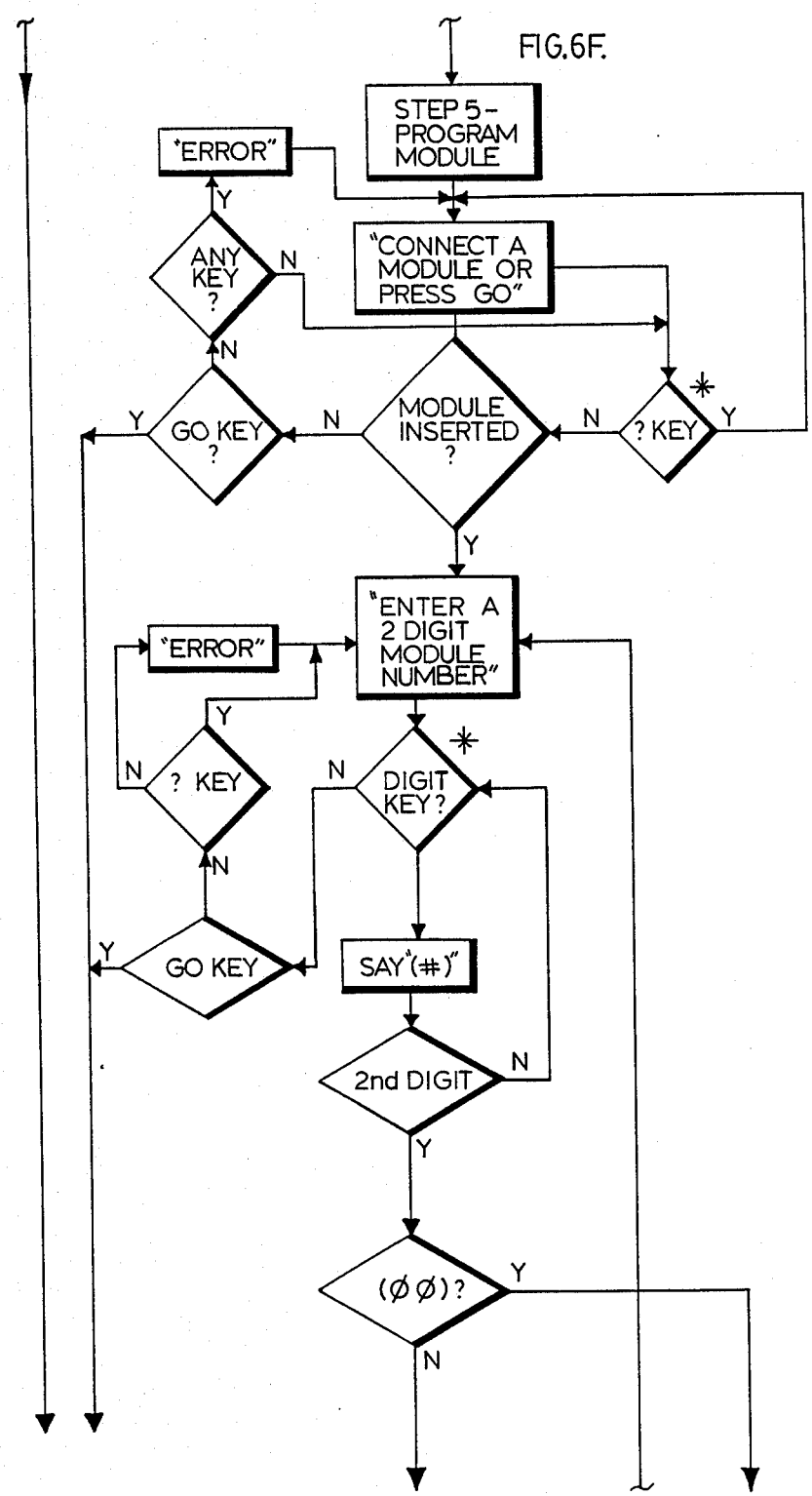
Figure 6J:
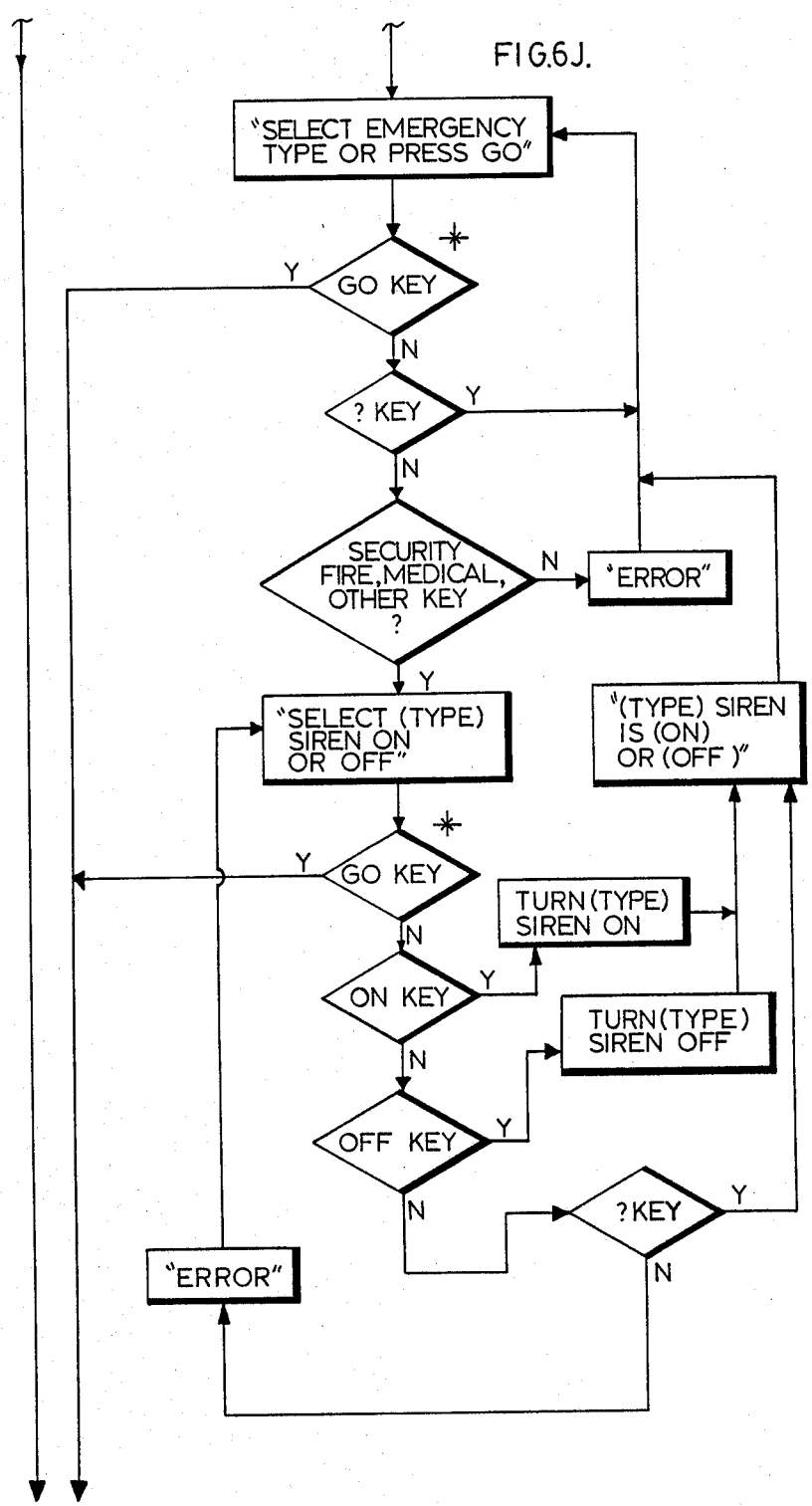
Figure 6K:
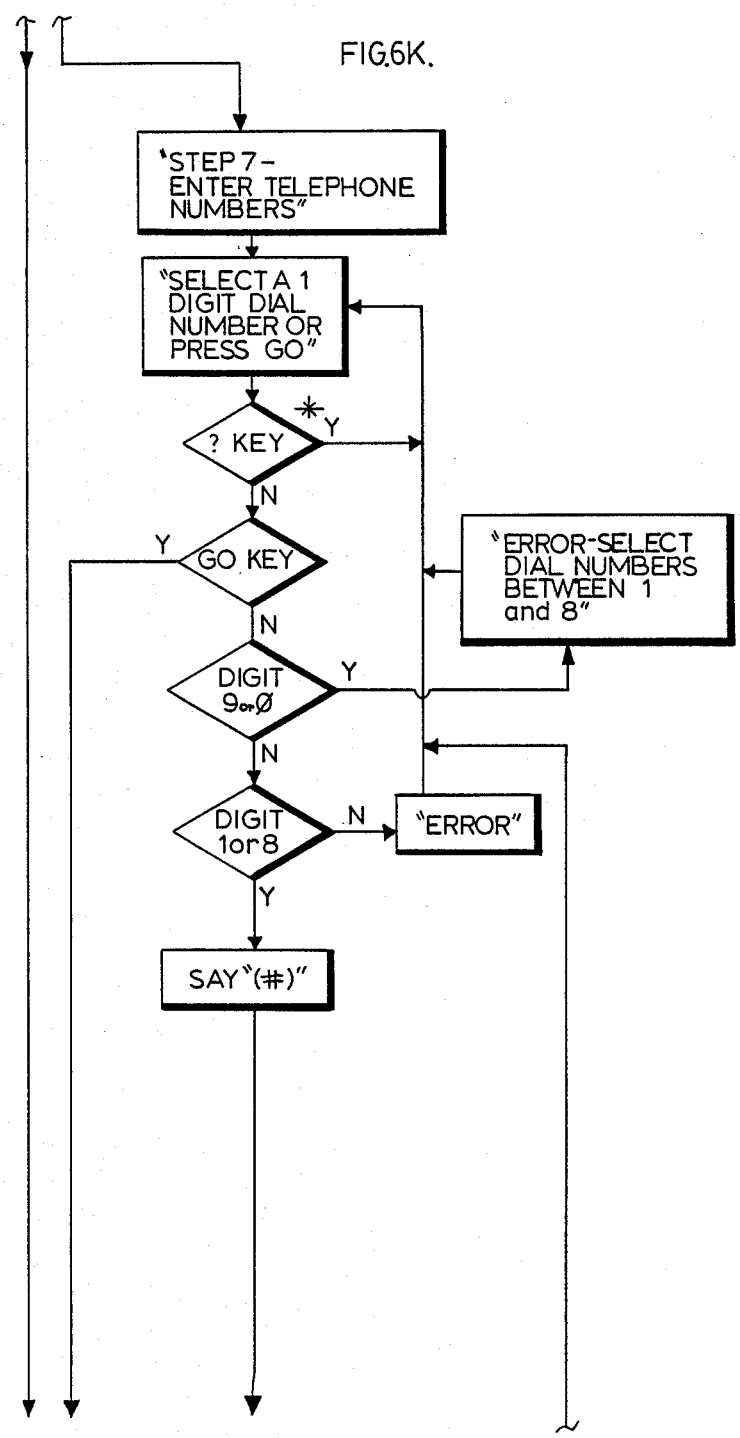
Figure 6N:
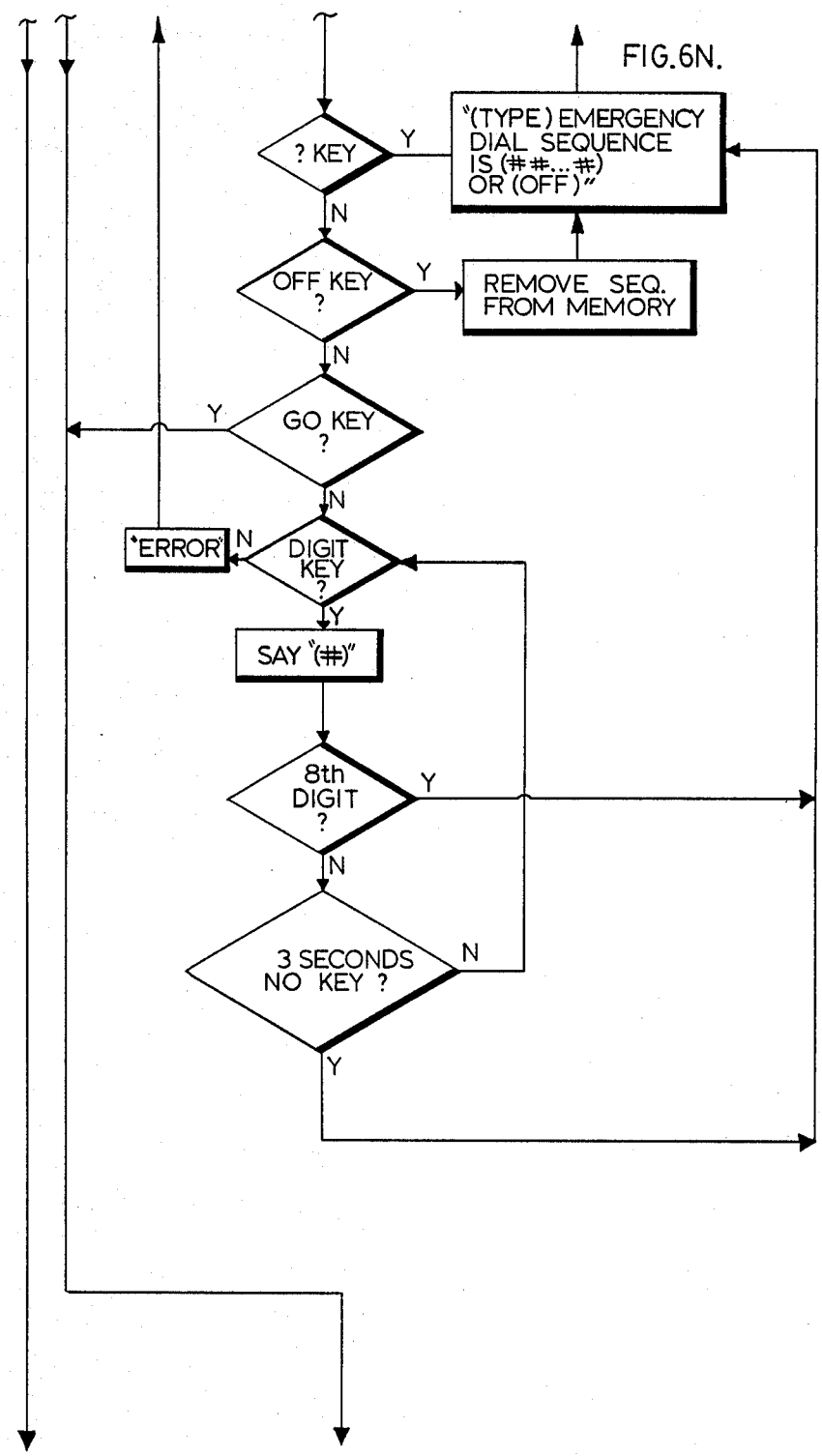
Figure 60:
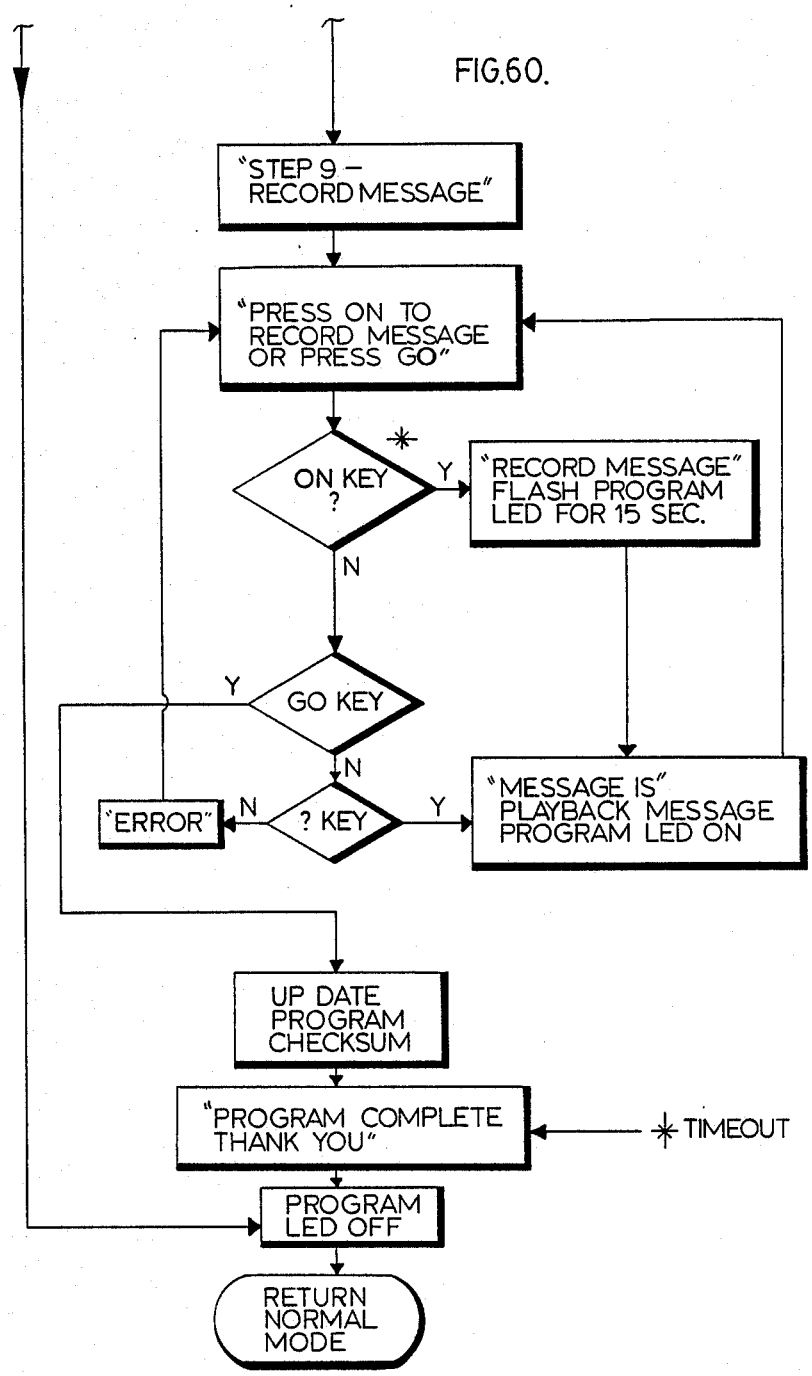

FIGS. 6a through 6p, apply to situations where more than two sensors are involved and a more complex programming schedule must be followed. Various alarms may be given priority depending whether or not the user is away or at home and whether or not security is armed. The following Table I illustrates the possible options which may be selected when the user is away, or desires home delayed response through entry doors, instant response when home, chime sequences when at home or other responses when the system is not armed to respond to a security threat.

TABLE I

| Source of Alarm | Away | Home Delayed | Home Instant | Chime | Security Not Armed |
| --- | --- | --- | --- | --- | --- |

TABLE I-continued

| | | | | | |
|---|---|---|---|---|---|
| Security Zone 1 (Sensors on access doors) | Delayed Alarm | Delayed Alarm | Instant Alarm | Chime | No Alarm |
| Security Zone 2,3,4 (Other Security Sensors) | Instant Alarm | Instant Alarm | Instant Alarm | Chime | No Alarm |
| Fire, Medical, Other Sensors | Instant Alarm | Instant Alarm | Instant Alarm | Instant Alarm | Instant Alarm |
| Emergency Code Alarm (on Console or Remote Keypad) | Emergency Alarm | Emergency Alarm | Emergency Alarm | Emergency Alarm | Emergency Alarm |

| | |
|---|---|
| No Alarm | Security protection is off and sensors will not cause an alarm |
| Delayed Alarm | Alarm delayed as you enter home. Reminder tone sounds. |
| Instant Alarm | Siren begins on detection. Dialer begins 10 seconds later. |
| Emergency Alarm | Siren and dialer begin simultaneously on detection. |
| Chime | No alarm, door chime sounds when sensors are triggered. |

Normally when the user is away, all security sensors are armed to protect the user premises. Sensors on access doors identified as Zone 1, will cause a delayed alarm so as to permit the user to re-enter the home and disarm the system without causing an unwanted alarm even if the user subsequently trips a different zone. However, breach of the sensors in Zones 2, 3 and 4 cause an instant alarm if Zone 1 has not been activated. Security Zones 2, 3 and 4 may be attached to windows and other building access areas which are not normally used. The user also has the option that, when at home, only certain security sensors may be armed. An instant or delayed alarm may be selected for sensors in Zone 1. Sensors in Zones 2, 3 and 4 will continue to cause an instant alarm due to their being fixed in areas where authorized entrance should not occur. Alternatively, the user may select the chime mode when staying at home. The unit then causes a chiming alarm when security in Zones 1 through 4 has been activated. Should an emergency alarm be activated, by pressing the Security, Fire, Medical or Other keys on the keyboard three times in three seconds, the system may be programmed to sound instantly the speaker/siren and begin to dial the appropriate emergency number. The telephone dialer then provides the necessary contact with people outside the monitored premises in an emergency situation. The microprocessor for controlling the dialer operation may be programmed to include the following features. The system replays a recorded message in user's voice to provide familiarity to those called. The message is digitally recorded thus avoiding the need for cassette tapes and the related moving parts to play back the message. The system is adapted to call up to eight different telephone numbers. The user can select a different sequence of numbers to be dialed for each type of emergency. The system is capable of calling local or long distance numbers up to twelve digits. Some of the stored numbers may be account numbers. For example, if dial #6 is only 3 or 4 account digits, then the console knows that #6 is an account number and #7 and #8 are central monitoring station telephone numbers.

The user can select either pulse or DTMF tone dialing. When the dialer receives an acknowledgement sent by the person answering the telephone, the person at the telephone may then listen in to what is happening in the monitored area. The dialer microprocessor 12 is adapted to activate the dialer system ten seconds after the siren alarm begins. This delay allows the user to cancel the alarm should it be false. The dialing of the number and the message to be played may be broadcast over the speaker horn system to alert intruders or others that telephone calls are being made. In dialing each number, the dialer microprocessor is adapted to relay the recorded message and identify the type of emergency. The dialer microprocessor will pause two seconds and listen for acknowledgement of the message. The person receiving the call presses any appropriate key, including the "*" button for three to five seconds to acknowledge the call. In the event that there is an acknowledgement, the microprocessor is adapted to turn on the console microphone and allow the person receiving the emergency call to listen for activity in the home. This can permit the user to inform the person at the other end in the event of a false alarm or a medical problem.

In the event that there is no acknowledgement at the receiving end, the dialer is adapted to repeat the emergency message sequence again. There are three repetitions of the message when the three to five second acknowledgement tone is not received. After three playbacks of the emergency message, the dialer hangs up and dials the next number on the list. The dialer will call up to eight different numbers. The dialer is adapted to continue calling these series of numbers until one acknowledgement is received, or until all numbers have been dialed two times.

To provide for some of the features of above noted dialer system and other advance features in the system, the instruction set must be supplemented with details of the user's requirements. With reference to FIGS. 6a through 6o, detailed instruction steps are provided for programming the system. To initiate the detailed programming mode, the "go" button is pressed to start the speech synthesizer. The console will prompt the user by requesting that the user enter the security code. The user then enters the three digit security code and the console next prompts the user to enter the house code if the security code is not the same as the house code. The user is then prompted to enter a new three digit visitor code, or if this has been done before, to press "go" to move to the next step. The priority of these codes is as follows, the house code is of highest priority and should only be known by the owner of the system, the security code is next and the visitor code is the lowest. The visitor code is intended for maids, workmen, neighbors, etc. It allows people to enter the home and disarm the system, then to re-arm it when leaving. The system does not allow "visitors" to turn sensors off or change the programming of the system. The security code is the most frequently used code. It is used daily by household members. It allows people to control the daily operation of the system, but not to deprogram the system. The house code, the highest priority, restricts access to programming to those with authority to change the way in which the system responds to emergency situations. After the user has established the house code, security code and visitor code, the next step is to decide on the delay period after an alarm has been detected in Zone 1 which is usually the entrance doors. The delay is set in the instruction set at 15 seconds. However, the user has the option to reset this delay from one to 99 seconds. In some situations, an extended length of time for entry may be necessary.

The next step is to program the module in more detail. A module is inserted into the module program socket !8 of the console and the control microprocessor senses its presence. The module programming software is then accessed to direct the programming of the module. In programming the module, a two digit number different from the others is inserted. The emergency type is then requested; i.e., select security, fire, medical, other. If security is selected, then the zone number must be entered where Zones 1 through 4 are the designated zones. Fire, medical and other do not require zone designations. The console will advise the user verbally of the status of the module just programmed and request it be removed; e.g. "remove module 02 security zone 2". Once the sensor module has been removed from the programming socket, it will request another be inserted, or press GO.

The user also has the option of silencing the siren as part of the alarm, when one or more of security, fire, medical or other sensors has been breached. For example, one can select an emergency, such as a fire, and then the controller microprocessor directs the speech synthesizer to announce "select emergency siren on or off". The user then selects "on" or "off" and then the control microprocessor directs the speech synthesizer to announce the status, such as "fire, siren is on".

The user may then move to the next step which is entering telephone numbers. Up to eight telephone numbers may be entered and their priority sequenced depending upon the type of emergency. The speech synthesizer is directed to ask the user to "select a one digit dial number". The user would start with the number 1, then the console is directed to ask of the user "enter telephone number or press off". If a telephone number is entered, the number of digits are counted, as shown in the flow diagram of FIG. 6*l* and 6*m*, after which the console will identify the number entered and its dial number. For example, the speech synthesizer can be directed to announce over the internal speaker "telephone dial number 1 is 1-800-268-2868". After all the desired numbers are entered, "go" is pressed to move to the next step in the programming sequence.

The user may then select the priority of the emergency telephone numbers. The speech synthesizer is then directed to announce "select emergency type or press go". Should medical be selected, the control microprocessor senses this status and directs the synthesizer to announce "enter emergency dial number sequence or press off". Should the user proceed, then the dial numbers one to eight are ordered in matter of priority, for example, 1, 2, 4, 7. After entry of this information, the console with the announcement "medical emergency dial sequence is 1, 2, 4, 7".

The last step in completing the detailed programming is to record the suitable message or change the message that has already been recorded. The control microprocessor directs the speech synthesizer to announce before the user's message and after the user's message the type of emergency situation. Hence the user need only identify the core of the message which is, in most instances, the user's name and address. The message usually notifies the listener that it is a prerecorded message on the home security system. The request is made for the listener to then investigate the emergency at the quoted address. After the message has been entered, the control microprocessor directs the speech synthesizer to announce the message that has been recorded. The user then listens to the message. The user has a choice of re-recording the message or pressing "go" to complete the program mode.

As is apparent from this detailed discussion of the programming mode, there are many checks in the data process which ensures that the user has provided the correct information to ensure integrity and accuracy in the operation of the system. By way of the instruction set, the user is prompted with various queries and reiteration of information entered, to ensure a logical entry of the necessary data and errors in the information entered are reduced to a minimum, if not totally eliminated.

Figure 7A:
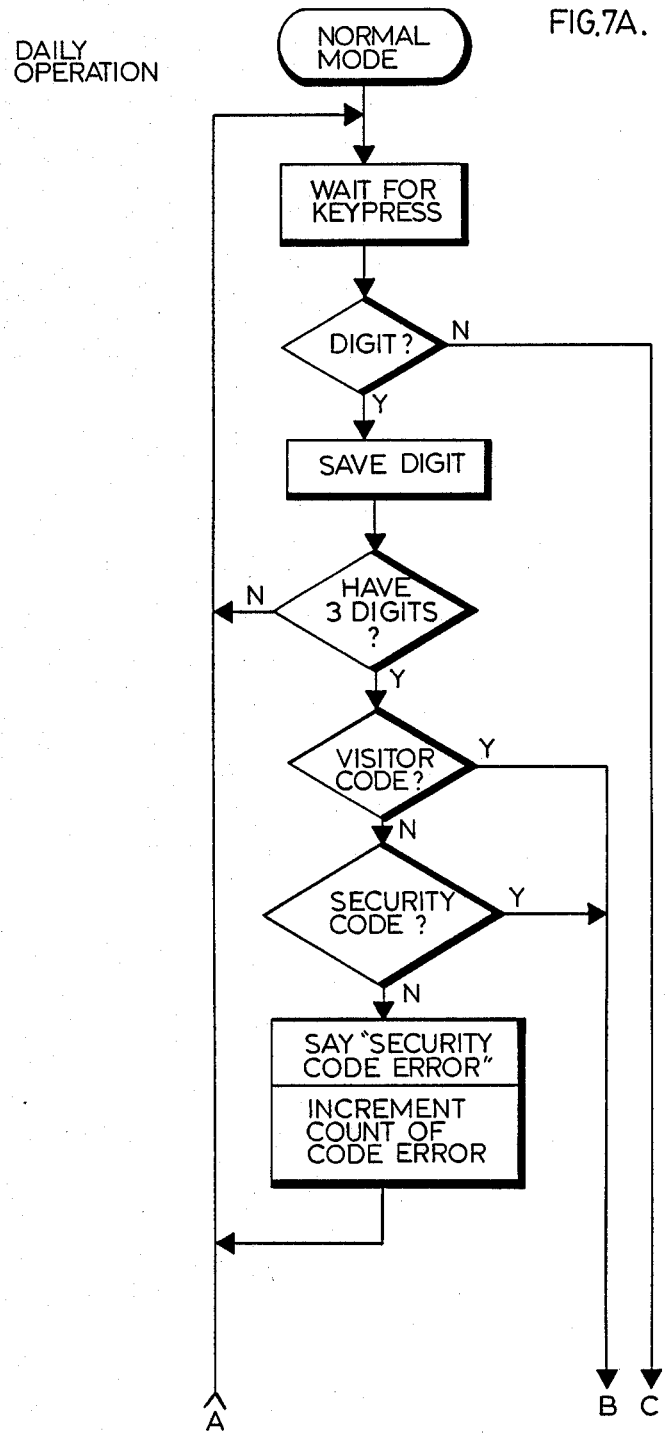
FIGS. 7a through 7s are flow diagrams of the logic of the system in responding to various inputs from the keyboard and the transmitted signal receiver.
Figure 7B:
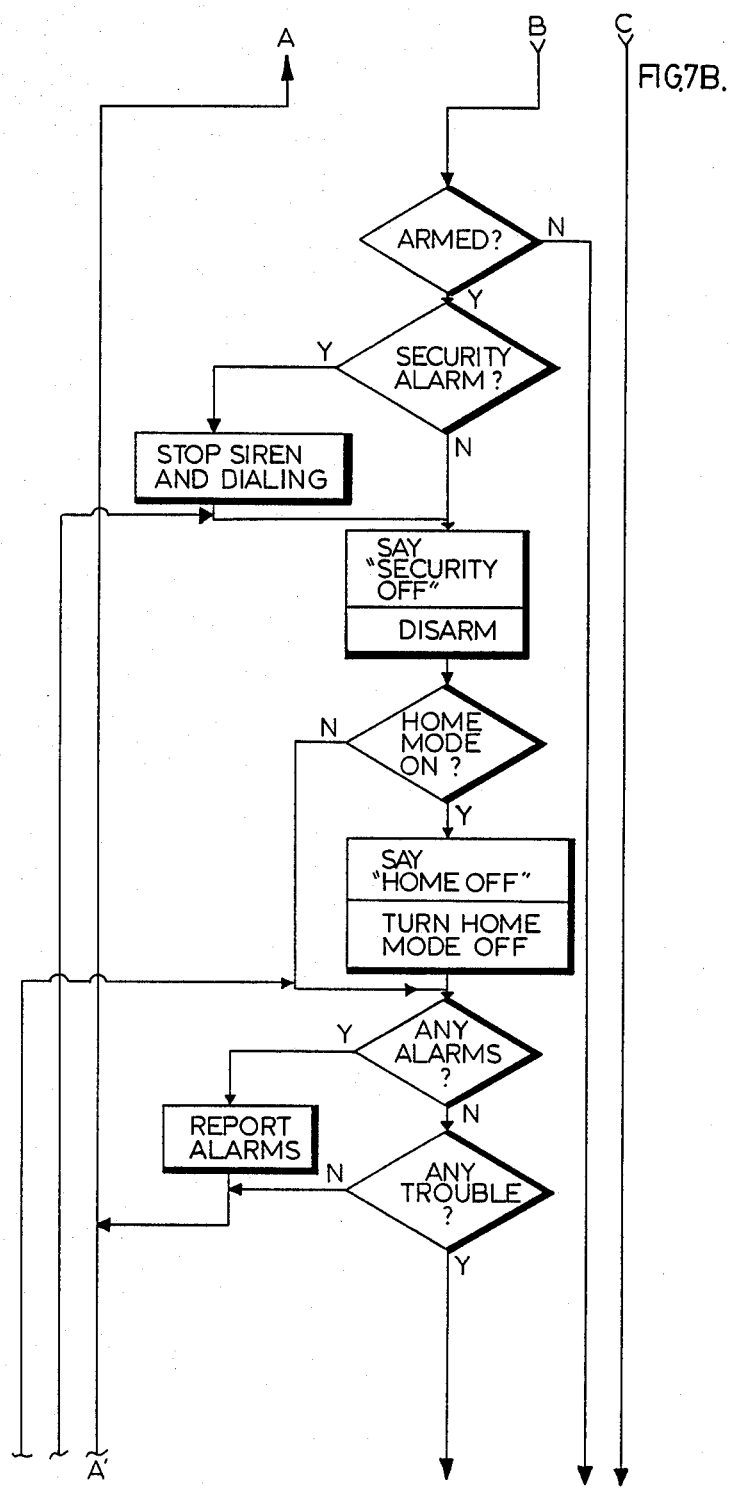
Figure 7C:
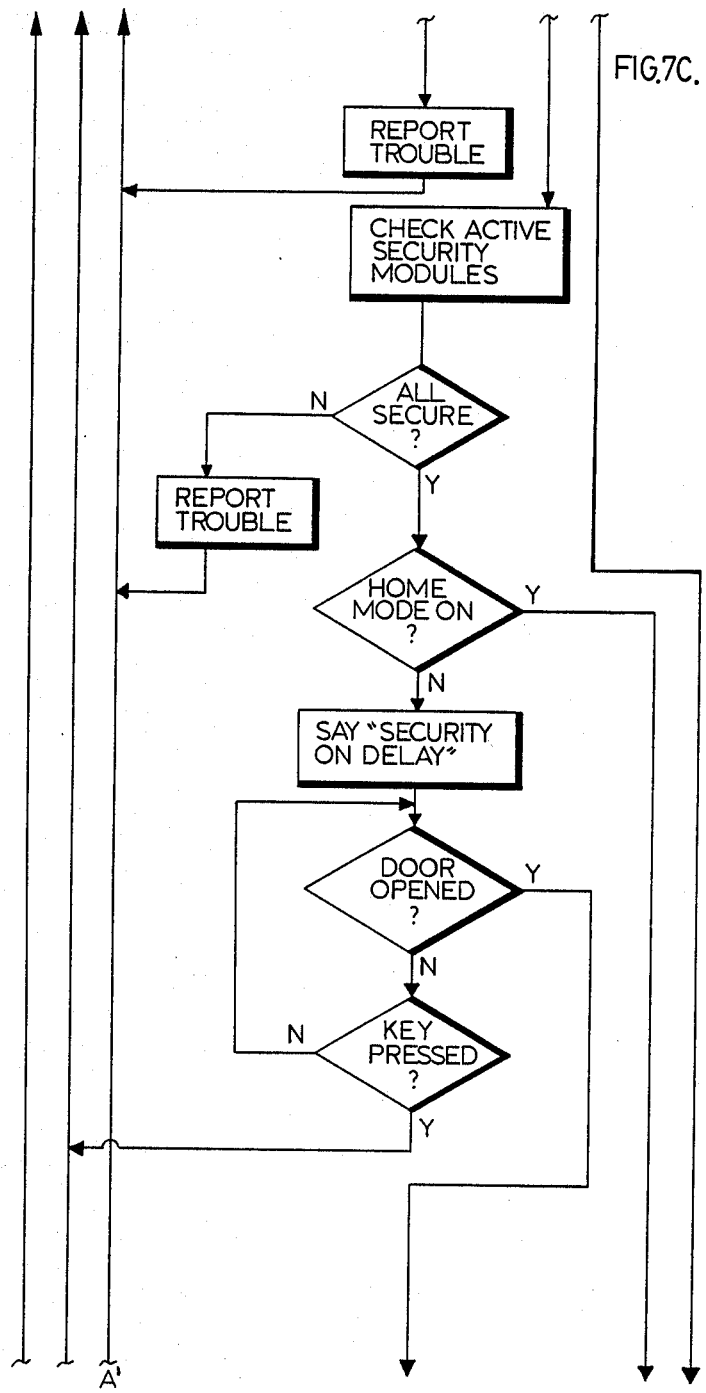
Figure 7D:
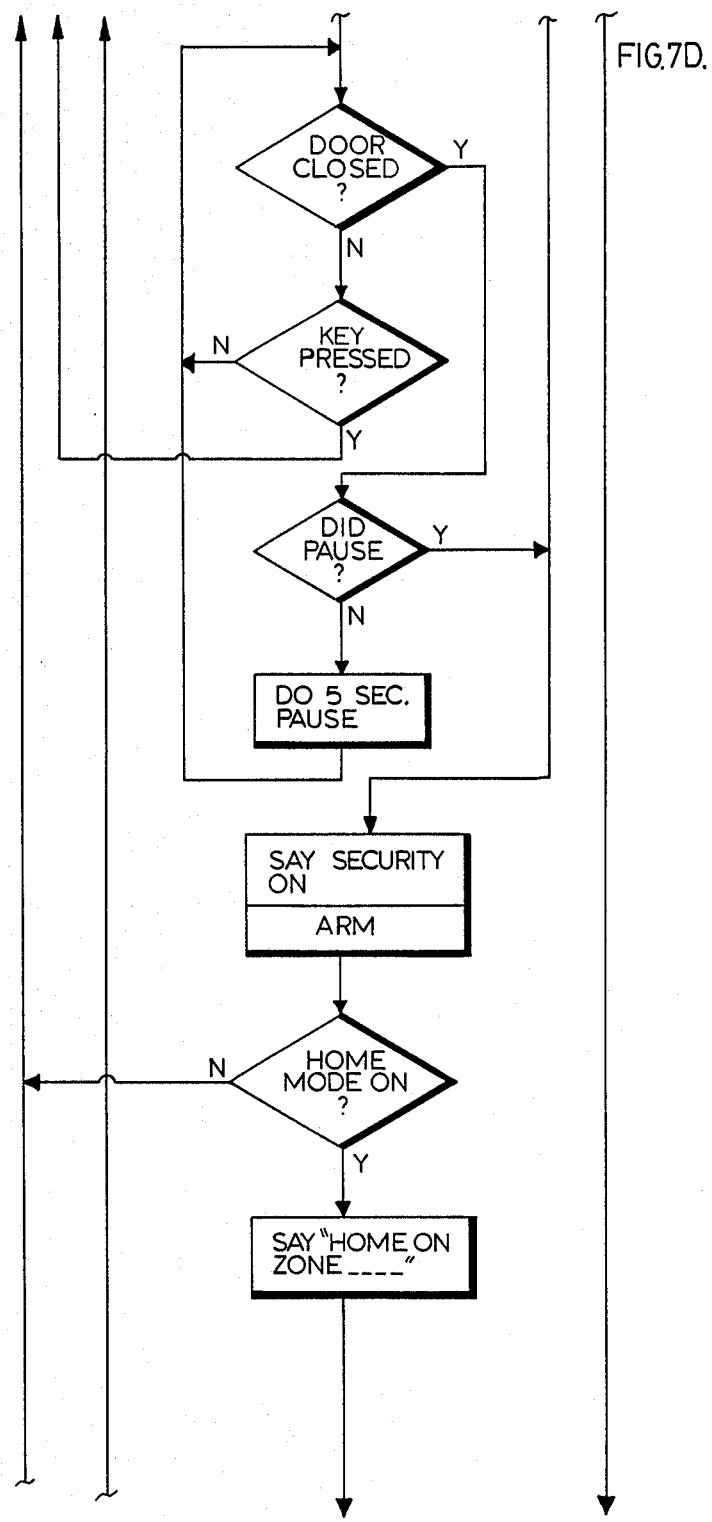
Figure 7E:
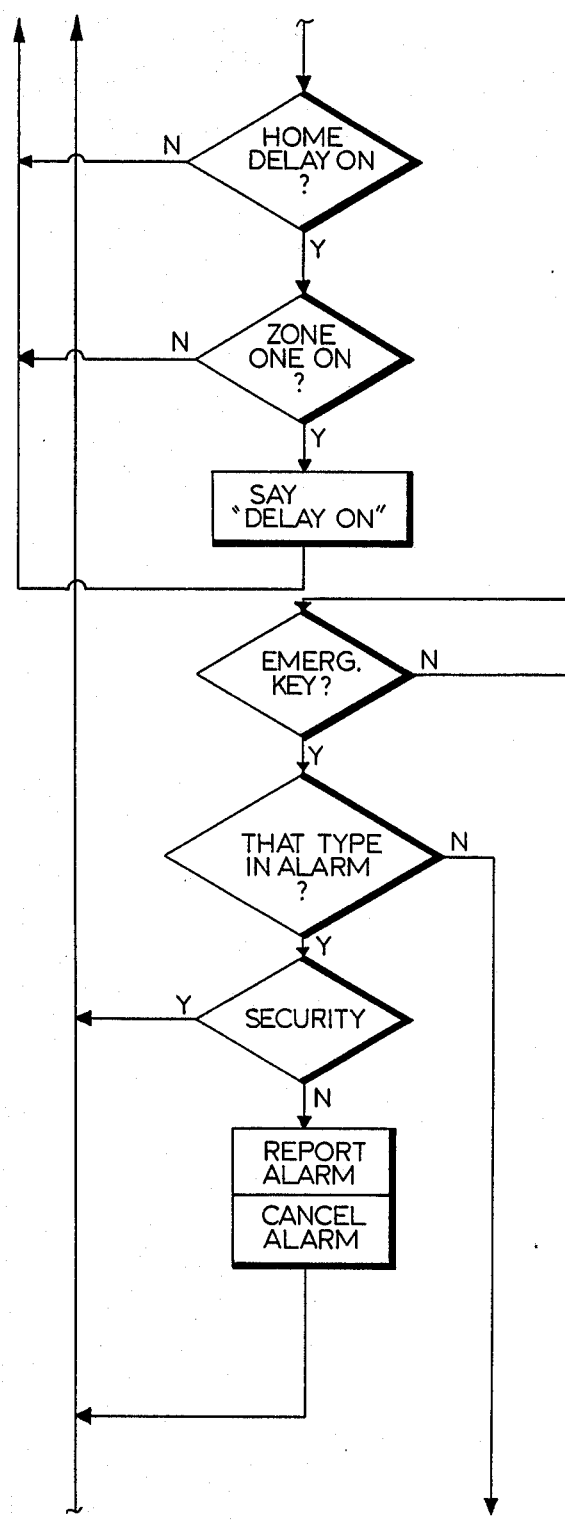
Figure 7F:
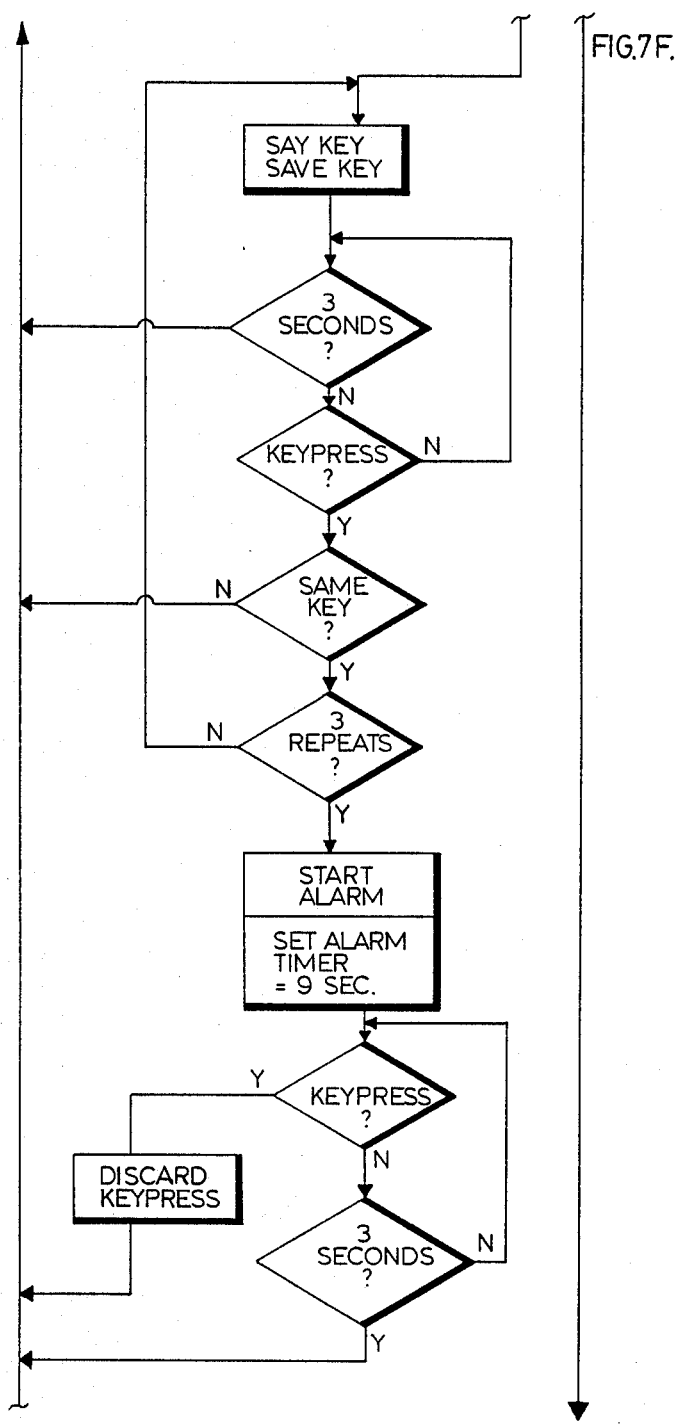
Figure 7H:
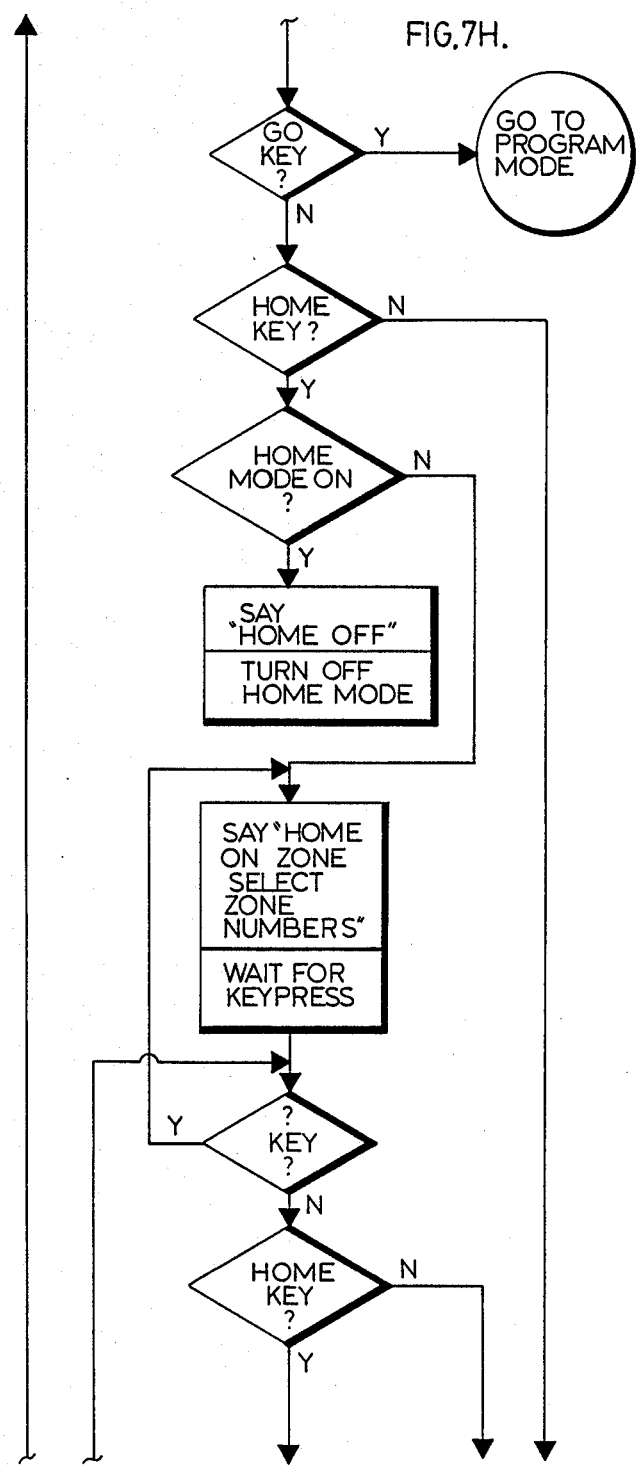
Figure 71:
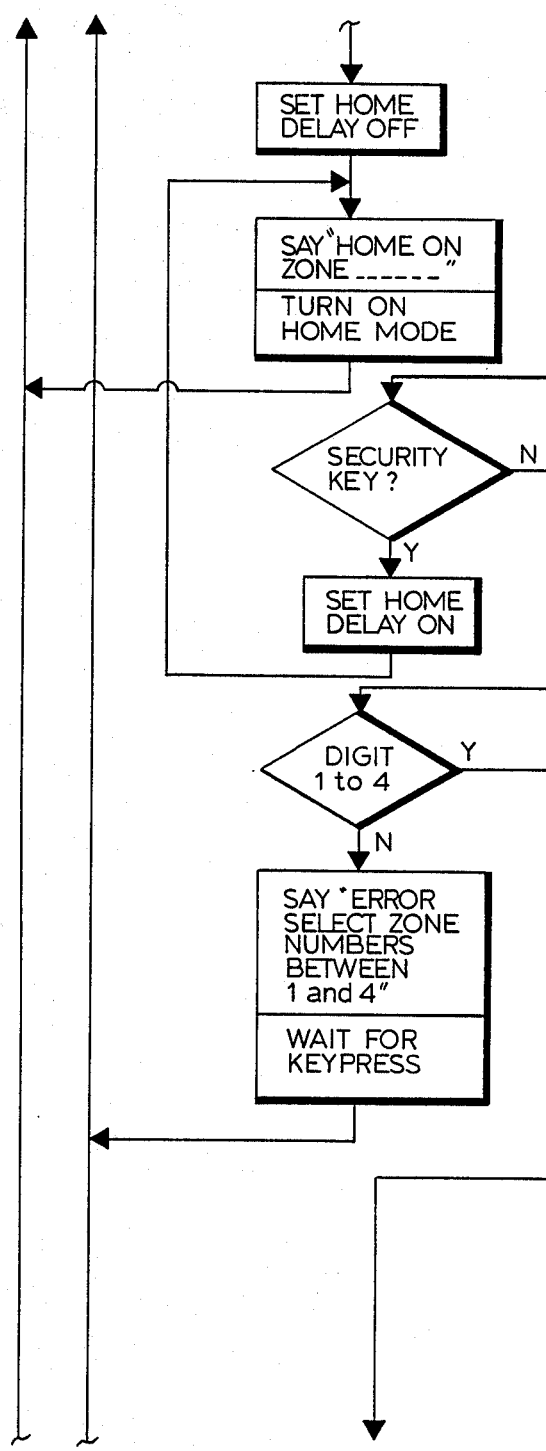
Figure 7J:
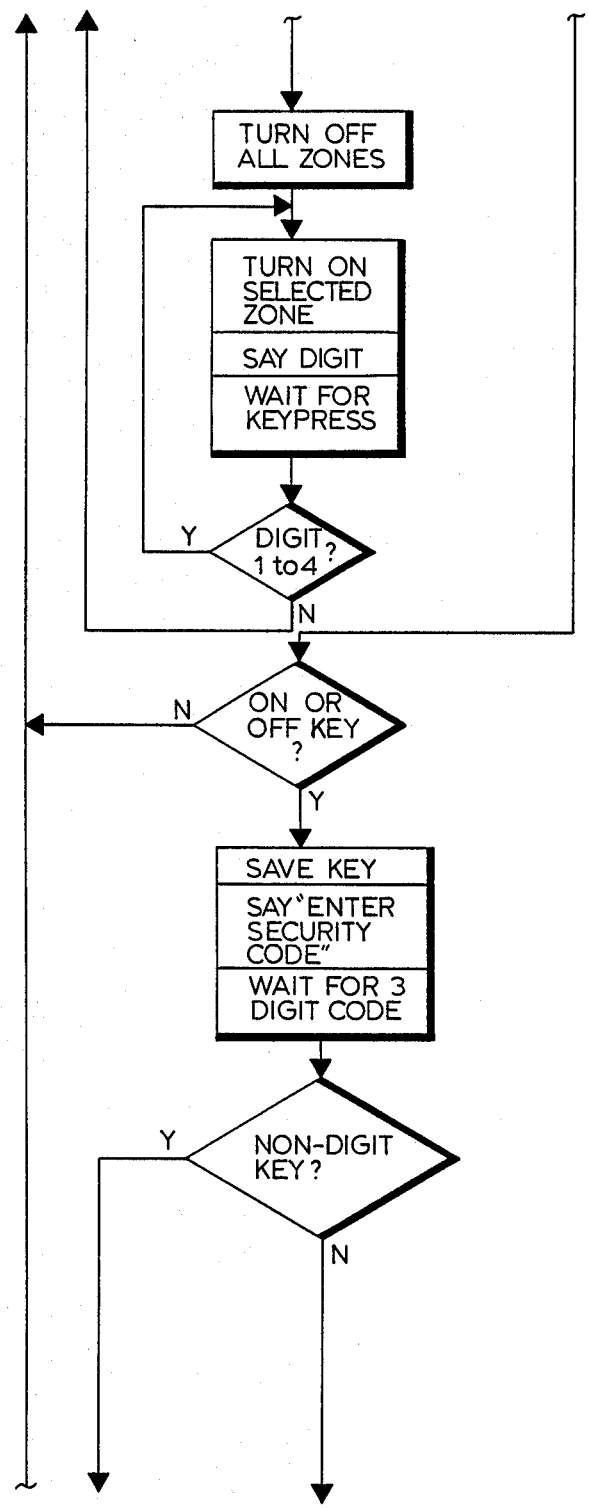
Figure 7L:
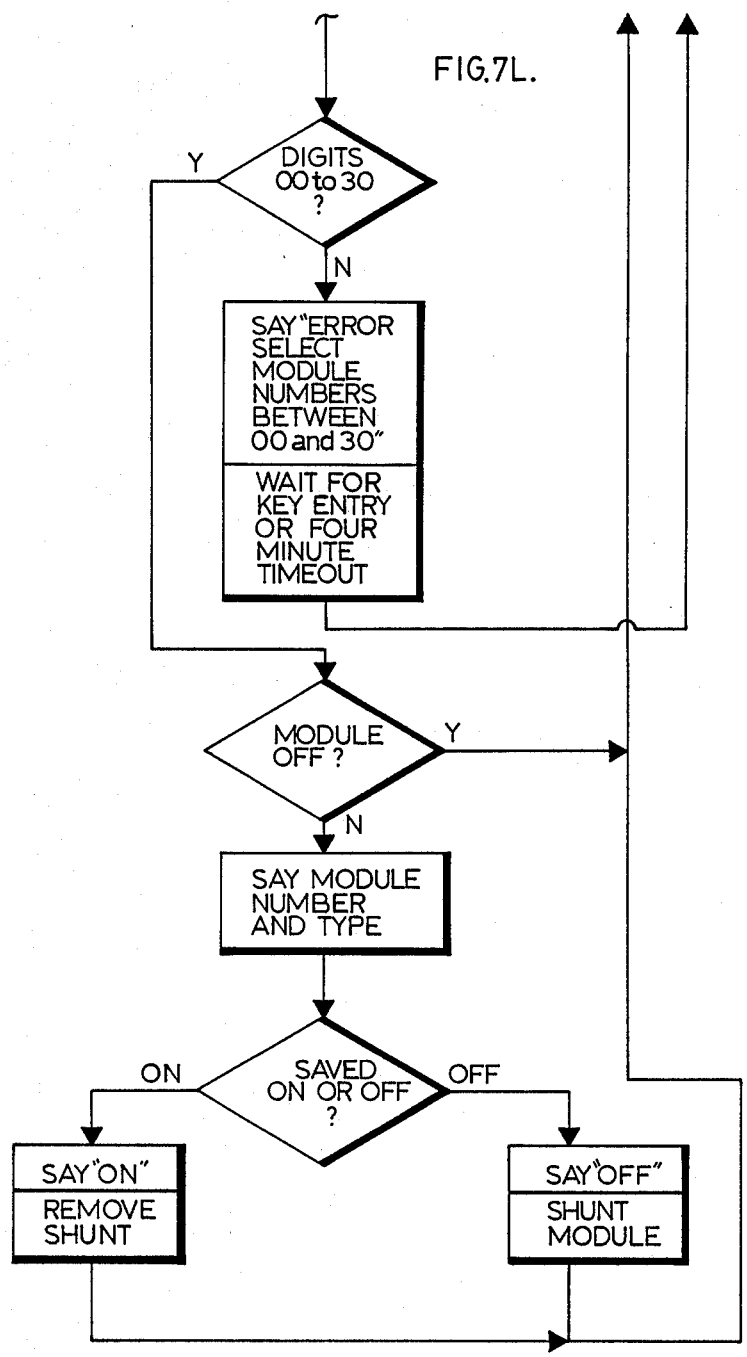
Figure 7M:
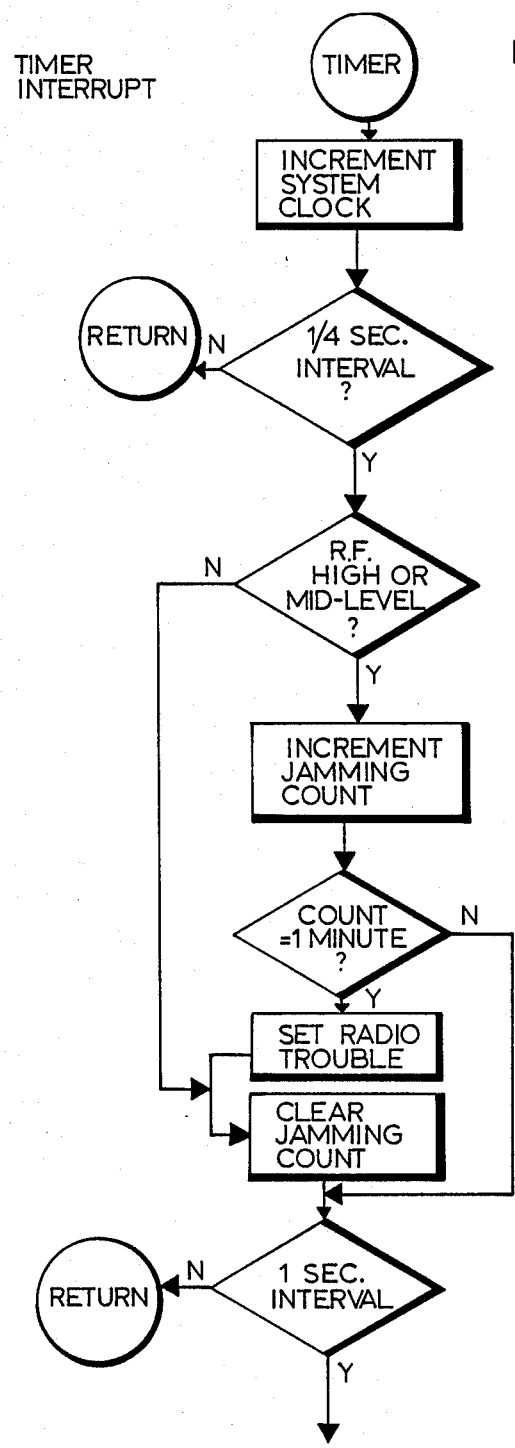
Figure 7N:
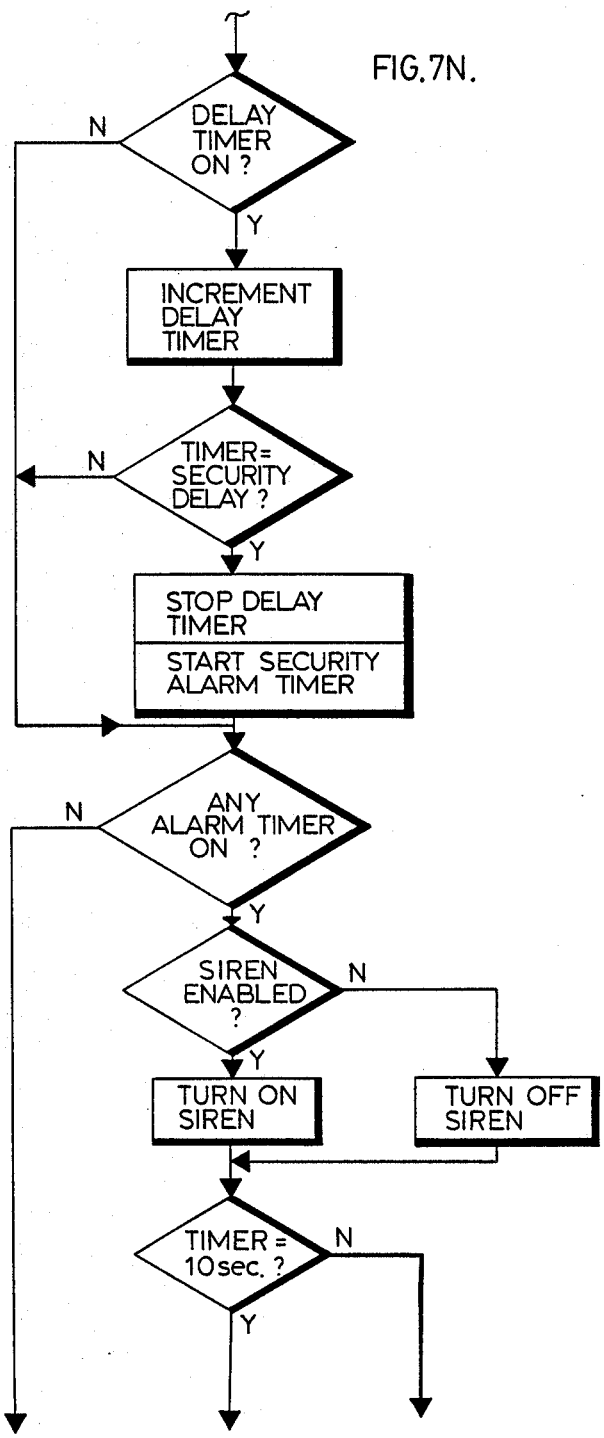
Figure 70:
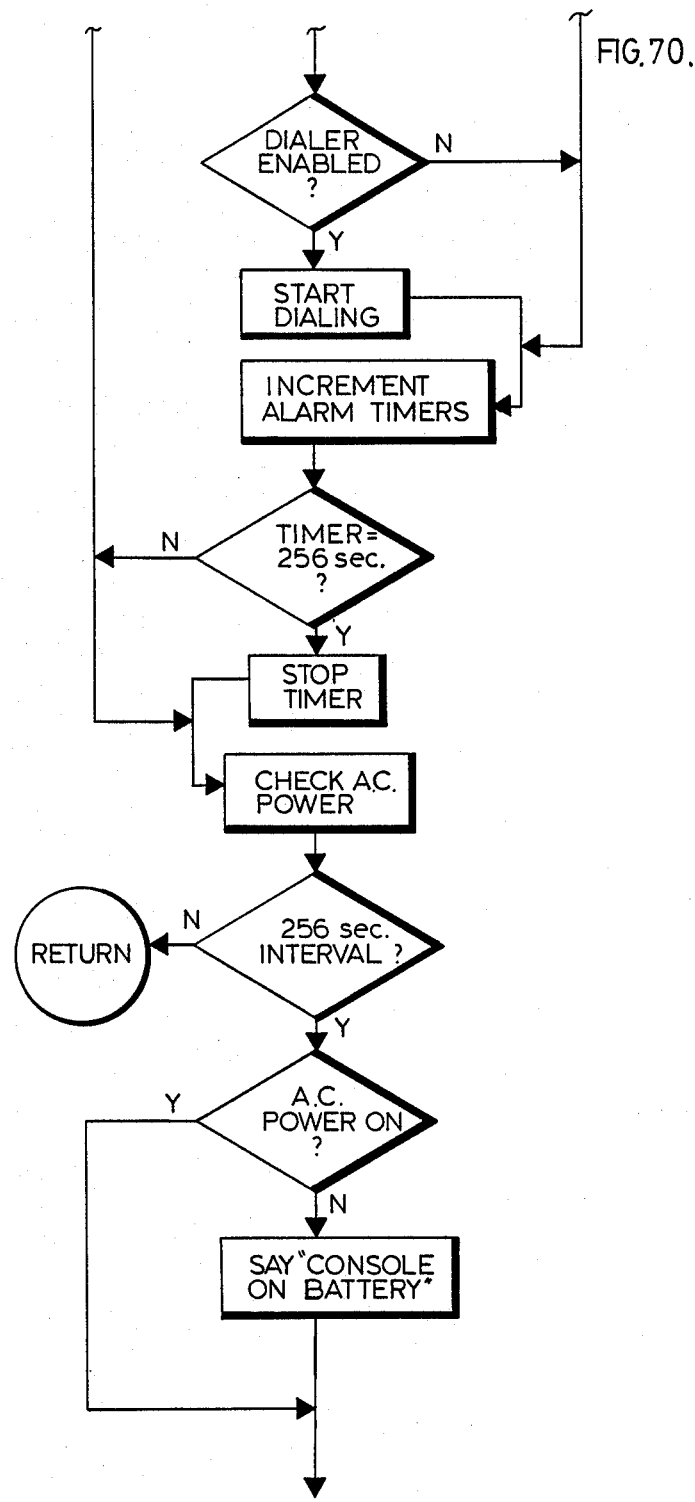
Figure 7P:
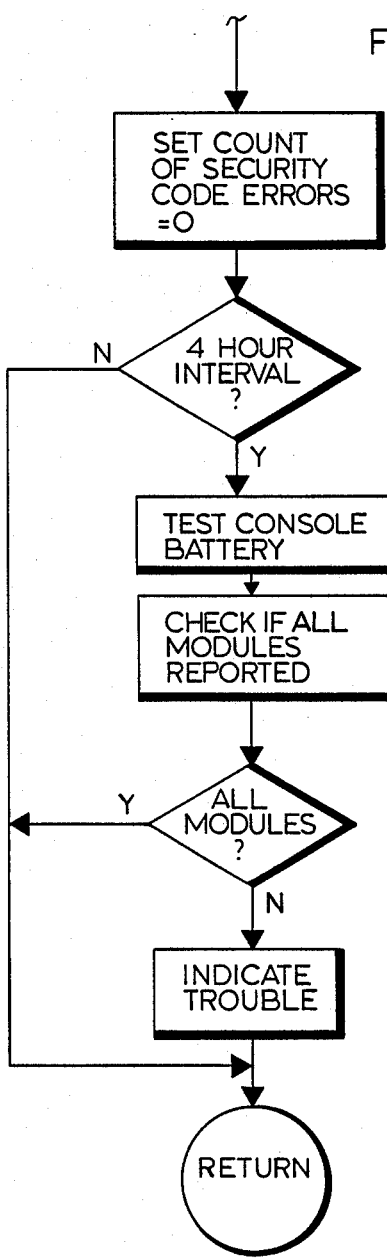
Figure 7Q:
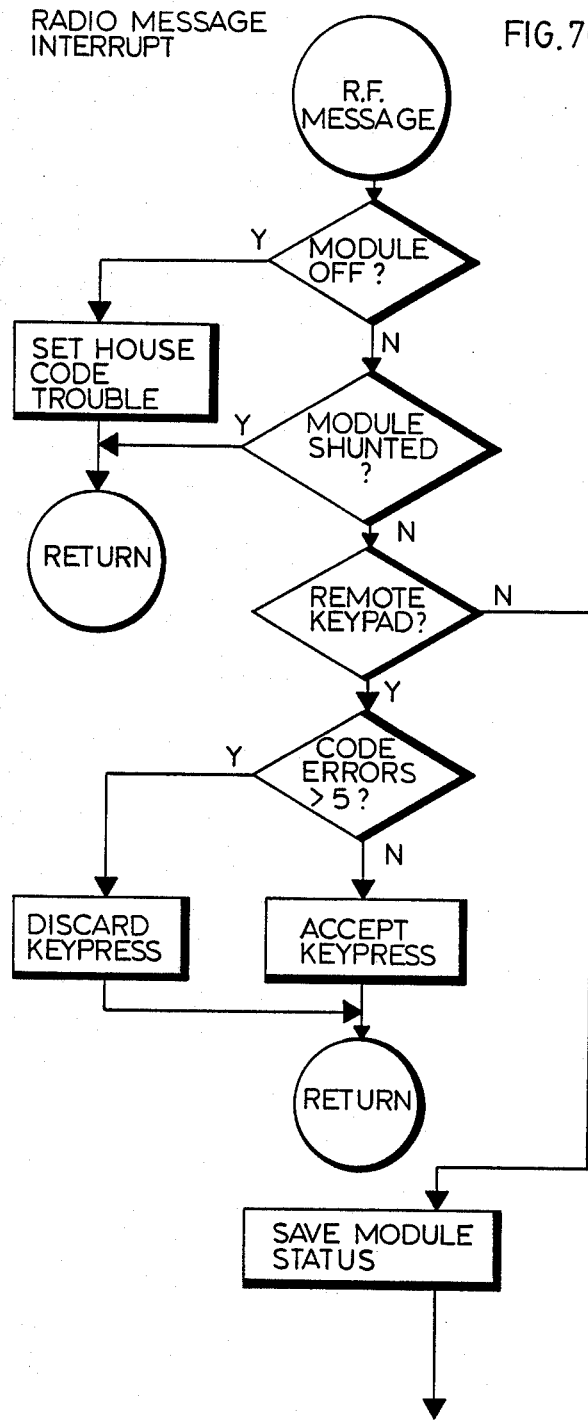
Figure 7S:
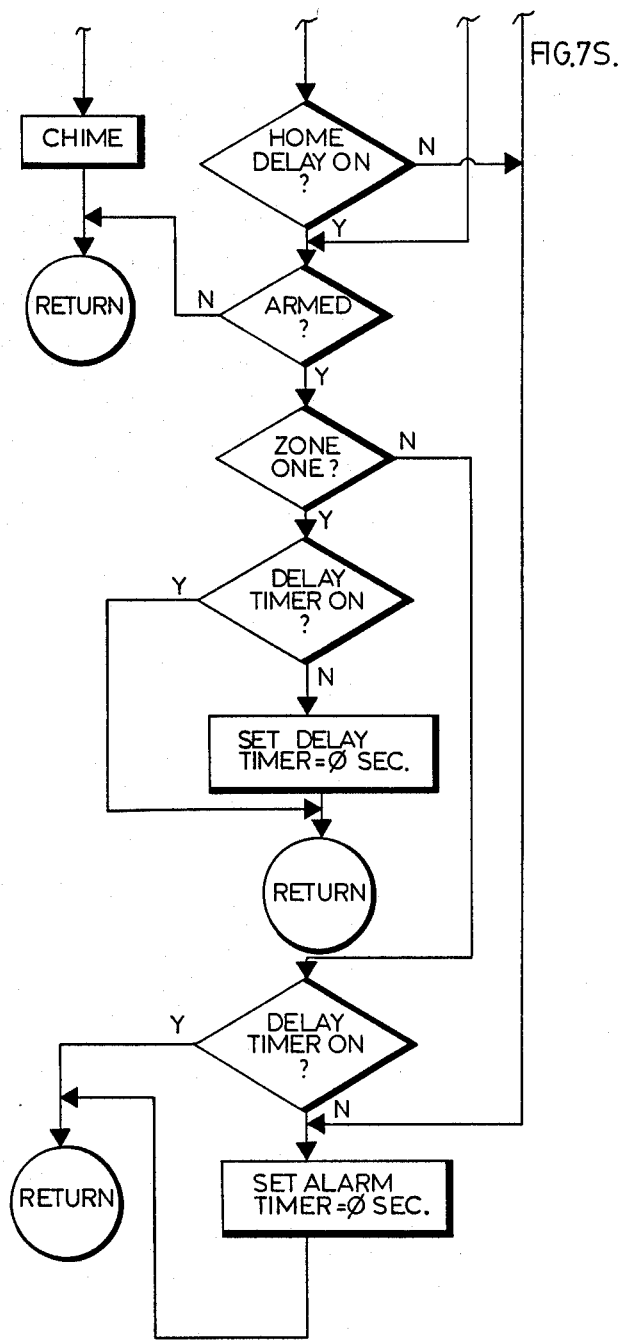
Figure 8D:
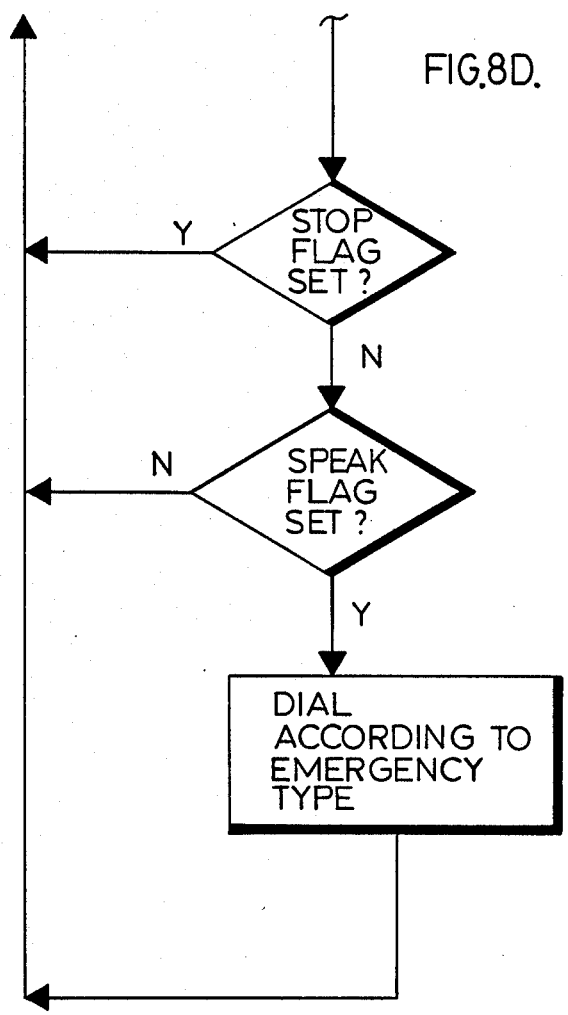

The daily operation of the system is summarized in the flow diagrams of FIGS. 7*a* through 7*s*. The purpose of the normal mode is to handle the daily operation requirements of the system. The principal part of this logic system is itemized in FIGS. 7*a* through 7(*l*). As part of the operation of the system in the normal mode, a timer interrupt routine is also required which is identified in FIGS. 7*m* through 7*p*. It is also necessary to provide a radio message interrupt sequence in the system and this is identified in FIGS. 7*q* through 7*s*. The interrelationship of these routines to the overall operation of the system is identified in FIG. 3. In the normal mode, the system handles day-to-day occurrences, such as "the coming and going" of people to and from the monitored premises, making certain announcements relative to such "coming and going" and dealing with other inputs, such as emergency, fire, and the like and detecting and identifying troubles in the system. To do this efficiently, the control processor asks a series of questions of the system on a routine basis which are identified as a string of events in FIGS. 7*a* through 7(*l*). The system will check for digit entries via the keypress and determine if the code entered is a security code, check for arming of security, check for home mode, check all modules, check for emergency keys, report detected alarms, report detected troubles, advise of errors in entering security code, other codes and zone codes. With respect to these particular problems which may be reported, examples of program trouble, other than those identified by the system during data entry by the user, would include checks to identify automatically error conditions in the stored information, such as accidental changes caused by severe lightening strikes. In that situation, the system is adapted to report a program trouble. Radio trouble can include an attempt by unauthorized people of jamming the RF transmission path for the transmitters. This may be monitored on the basis of the system being adapted to look for a continuous RF signal of greater than sixty second duration. In detecting such a continuous RF signal, the user is alerted of radio trouble. House code trouble may arise when two homes within RF proximity use identical house codes. The system is adapted to detect this situation by determining that different module numbers are present, even though the house code is the same. In that event, the system is adapted to alert the user of a house code trouble thereby necessitating a change in the house code.

The function of the timer interrupt and the radio message interrupt are note in the flow diagrams.

The functions of the second slave microprocessor for speech and dialing, are shown by the flow diagrams of FIGS. 8a through 8d. The sequences followed in synthesizing speech, locating numbers to be dialed and then executing the speech synthesis or dialing are as demonstrated.

Accordingly, this invention provides a security system which may be readily used and installed by the home owner. There is a significant advantage over existing systems because of interactive voice communication with the user. The system is provided with an appropriate means which checks information being input by the user in customizing the program and ensures that no errors in the messages entered occur. By use of a dual microprocessor system, where a control microprocessor interacts with the speech/dialer microprocessor, the speed of the system is considerably increased. By broadcasting announcements over the loudspeaker, the user can, in the test mode, locate the transmitter modules in areas which will provide optimum signal strength. The announcements over the loudspeaker eliminates the user having to return to the console to determine signal strength. Another benefit of the dual speaker communication system is that, in an alarm condition due to an intruder, the speaker on the console remains silent to thwart efforts by the intruder to locate the central monitor system and console and attempt to destroy and render the system useless.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A security system comprising a central monitor and a plurality of remote sensors for one or more of fire, smoke, intrusion, appliance operation and the like, each of said sensors having a transmitter for transmitting an electronic message when said sensor detects an alarm condition, said central monitor having a receiver to receive such electronic message, and an electronic microprocessor control system to decode the received electronic message and taking a necessary course of action in accordance with a programmable scheme retained in an electronic memory of said microprocessor system, said central monitor having a speech synthesizer responding to inputs from said microprocessor system, a keyboard being provided on said central monitor for allowing a user to interact with said security system, said microprocessor system being programmable via said keyboard thereby permitting a user to customize said programmable scheme by interaction with said security system through said keyboard to render thereby the scheme unique to such user, said microprocessor system actuating said speech synthesizer to synthesize predetermined messages in response to input from said keyboard and in accordance with said programmable scheme, said microprocessor system having means for checking data as it is entered by said keyboard against what is required by said programmable scheme, means for initiating said microprocessor system to actuate said speech synthesizer to synthesize a message relating to information input by said keyboard, said initiating means causing an error message to be synthesized when information entered via said keyboard is in error when said checking means verifies such information against what is required by said programmable scheme, and an internal speaker and an external speaker, said microprocessor system actuating said internal speaker to announce said error message, said microprocessor system actuating said external speaker to announce an alarm message produced by said speech synthesizer when said sensor detects an alarm condition, means for driving said external speaker to sound a siren alarm, said microprocessor system selectively actuating said siren driving means to sound said siren alarm on actuating said external speaker to announce an alarm message generated by said speech synthesizer.

2. A security system of claim 1, wherein said speech synthesizer comprises a second microprocessor separate from said microprocessor control system, said microprocessor control system intercommunicating with said second microprocessor.

3. A security system of claim 1, wherein means senses signal strength level of said transmitted electronic message, means for connecting signal strength level sensed by said sensing means into digital code representative of high, medium, low or weak strengths, said speech synthesizer being actuated by said microprocessor system to announce a message of high, medium, low or move corresponding to the sensed signal strength level.

4. A security system of claim 2 wherein said second microprocessor includes means for dialing a predetermined sequence of telephone numbers, programmable electronic memory for storing telephone numbers and means for addressing said electronic memory to select a telephone number to be dialed by said dialing means, a microphone for picking up ambient noise, means for selectively connecting said microphone to a telephone network and amplifying any picked up ambient sound for transmission over a telephone network, in the event of a predetermined type of alarm condition said microprocessor control system actuates said dialing means to dial a selected telephone number, said microprocessor control system actuating said speech synthesizer to generate a message to be transmitted over a telephone network, said microprocessor control system actuating said means for selectively connecting said microphone to a telephone network after a message has been transmitted to permit thereby a person connected to such telephone network to listen to ambient sound through said microphone in an area being monitored by said security system.

5. A security system of claim 4, wherein said microprocessor control system having means for directing data entered by said keyboard to said second microprocessor for storage in said programmable electronic memory, said microprocessor control system actuating said speech synthesizer to generate a message requesting specific information of a user, said directing means directing a user's data input via said keyboard to said programmable memory means, said speech synthesizer having means for connecting a user's at a input stored on said programmable memory means into an analog announcement, said microprocessor control system actuating said speech synthesizer to announce through at least one of said internal and external speakers said analog announcement to enable a user to verify accuracy of data entered by said keyboard, said microprocessor control system having means for permitting a user to reenter data in the event verification of data by a user requires a change in data previously entered.

6. A security system of claim 1, wherein said microprocessor control system includes means for actuating either said external speaker remote of said central monitor or internal speaker of said central monitor as predetermined by type of message to be announced, said microprocessor control system directing said actuating means for said speakers to actuate only said external speaker in the event of announcing an intrusion alarm condition to avoid thereby an intruder locating said central monitor.

* * * * *

UNITED STATES PATENT AND TRADEMARK OFFICE
CERTIFICATE OF CORRECTION

PATENT NO. : 4,821,027
DATED : April 11, 1989
INVENTOR(S) : John Mallory et al

It is certified that error appears in the above-identified patent and that said Letters Patent is hereby corrected as shown below:

Column 16, line 59, "at a" should read -- data --

Signed and Sealed this

Sixth Day of March, 1990

Attest:

JEFFREY M. SAMUELS

*Attesting Officer*     Acting Commissioner of Patents and Trademarks